(12) United States Patent
Bisang et al.

(10) Patent No.: US 11,174,882 B2
(45) Date of Patent: Nov. 16, 2021

(54) CABLE HOOK OF A FIXING DEVICE FOR A TRAMPOLINE

(71) Applicant: Angehrn AG Umformtechnik, Degersheim (CH)

(72) Inventors: Erwin Bisang, Huenenberg (CH); Christian Mehr, Kirchberg (CH)

(73) Assignee: Angehrn AG Unformtechnik, Degersheim (CH)

( * ) Notice: Subject to any disclaimer, the term of this patent is extended or adjusted under 35 U.S.C. 154(b) by 0 days.

(21) Appl. No.: 16/530,095

(22) Filed: Aug. 2, 2019

(65) Prior Publication Data
US 2020/0040922 A1 Feb. 6, 2020

(30) Foreign Application Priority Data

Aug. 2, 2018 (EP) .................................... 18187087

(51) Int. Cl.
*A63B 5/11* (2006.01)
*F16B 5/06* (2006.01)

(52) U.S. Cl.
CPC .............. *F16B 5/0692* (2013.01); *A63B 5/11* (2013.01)

(58) Field of Classification Search
CPC ............ A63B 21/0552; A63B 21/0555; A63B 21/0557; A63B 71/0054; A63B 5/11; A63B 21/02; A63B 21/028; A63B 21/04; A63B 21/0407; A63B 21/055; A63B 21/15; A63B 21/151; F16B 5/06; F16B 5/0685;

(Continued)

(56) References Cited

U.S. PATENT DOCUMENTS 3,528,656 A * 9/1970 Haanen .............. A63B 21/0004
482/139
7,914,426 B1 * 3/2011 Lie ..................... A63B 21/0004
482/126

(Continued)

FOREIGN PATENT DOCUMENTS

DE 10226707 A1 1/2004
DE 202007019487 U1 11/2012
WO WO 2017/191144 A1 11/2017

OTHER PUBLICATIONS

European Search Report of European Application Serial No. 18187087.4 dated Dec. 7, 2018, 13 pages.

*Primary Examiner* — Garrett K Atkinson
*Assistant Examiner* — Zachary T Moore
(74) *Attorney, Agent, or Firm* — Fay Sharpe LLP

(57) ABSTRACT

A cable hook for fixing a rebound mat to a trampoline frame by means of two elastic elements and at least one flexible strap element has a housing with four receivers, wherein each elastic element has two free ends, each of which has a clamping element enlarging the periphery of the elastic element. A clamping element is inserted in each receiver. The cable hook has a cable hook body which is closed in the peripheral direction transversely to the fixing direction, wherein in each case two receivers are separated centrally by a receiving cavity in the cable hook body through which a clamping element can be passed. The cable hook has two terminating pieces which can each be inserted in a respective receiving cavity, and each has a cover rounding pointing away from the cable hook housing and oriented towards each other.

11 Claims, 26 Drawing Sheets

(58) Field of Classification Search
CPC ........ F16B 5/0692; F16B 45/00; F16B 45/04; F16B 45/06; F16G 11/14
See application file for complete search history.

(56) References Cited

U.S. PATENT DOCUMENTS

| | | | |
|---|---|---|---|
| 2003/0223808 A1* | 12/2003 | Kuo | A63B 21/1609 |
| | | | 403/220 |
| 2010/0009812 A1 | 1/2010 | Pieper Genannt Schmauck | |
| 2013/0288864 A1* | 10/2013 | Holland | A63B 21/00065 |
| | | | 482/126 |
| 2016/0287926 A1 | 10/2016 | Chen | |
| 2016/0296782 A1* | 10/2016 | Dai | A63B 21/0557 |
| 2016/0310774 A1* | 10/2016 | Publicover | A63B 5/11 |
| 2018/0353789 A1* | 12/2018 | Tseng | A63B 1/00 |

* cited by examiner

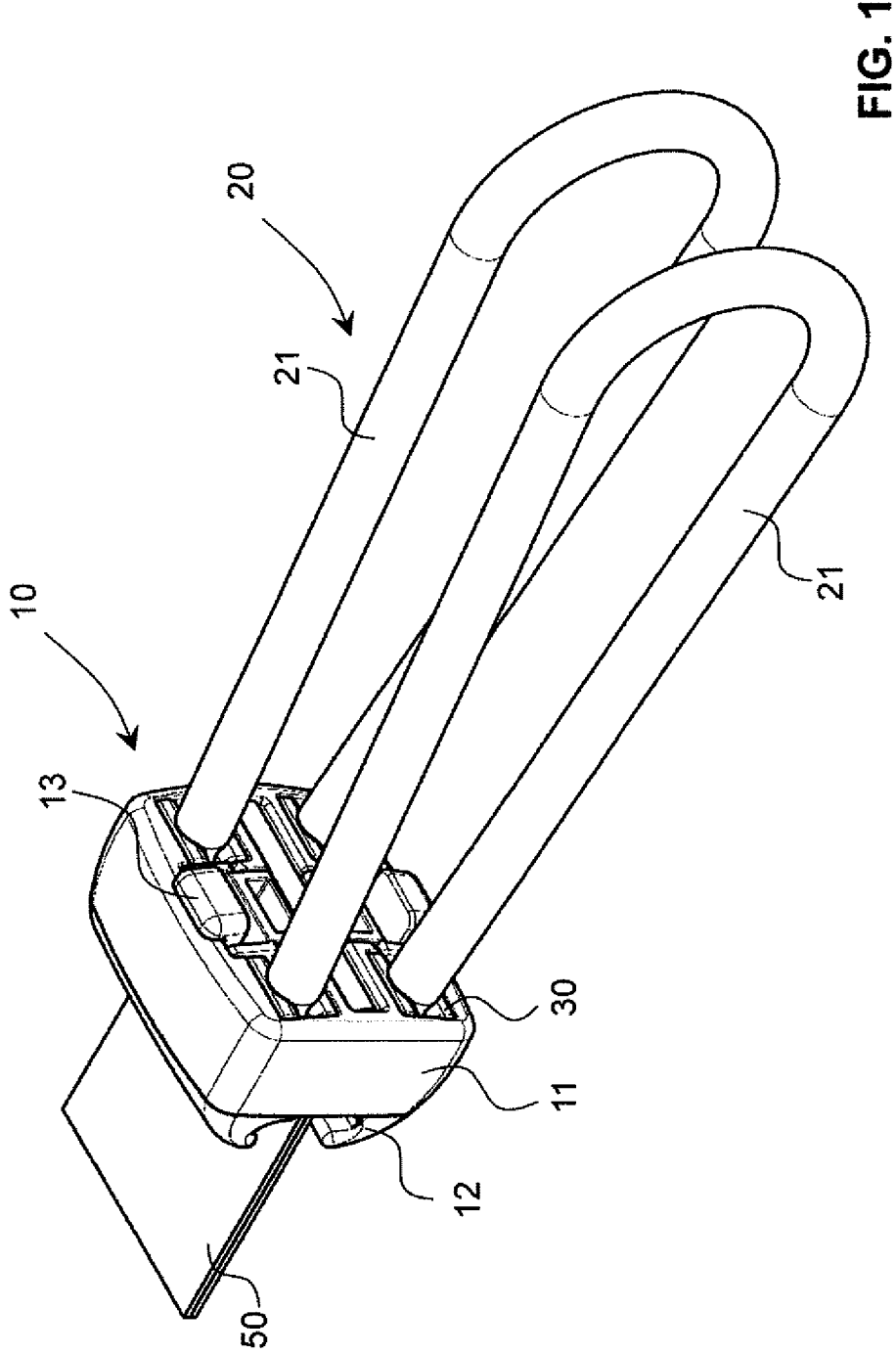

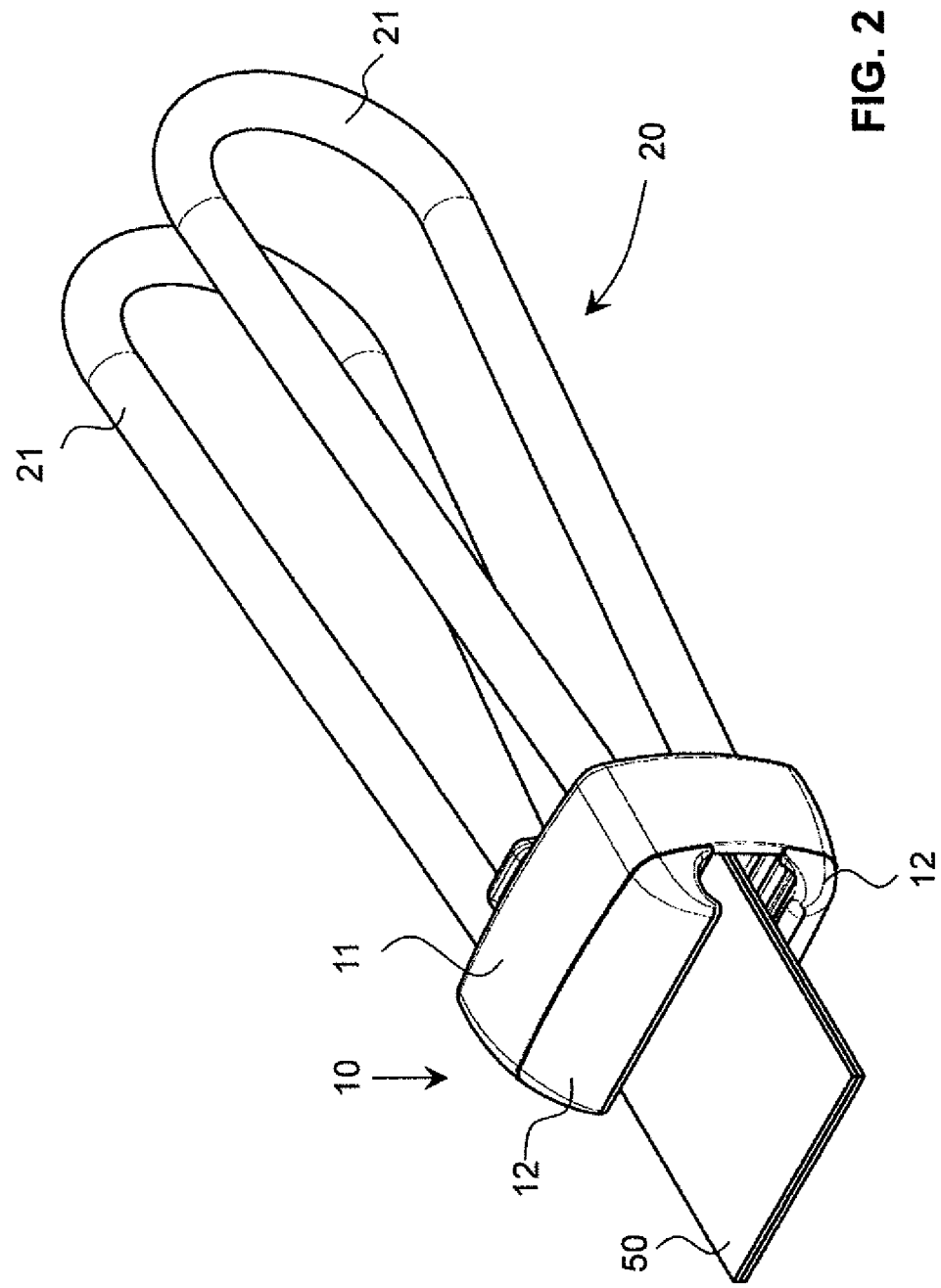

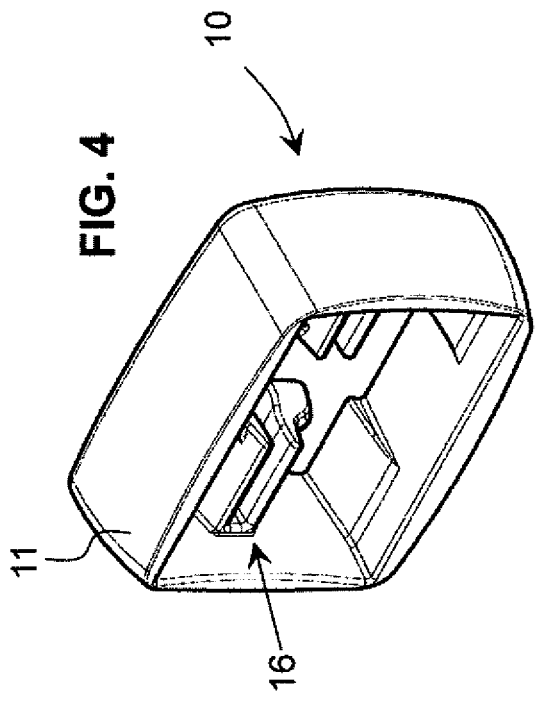
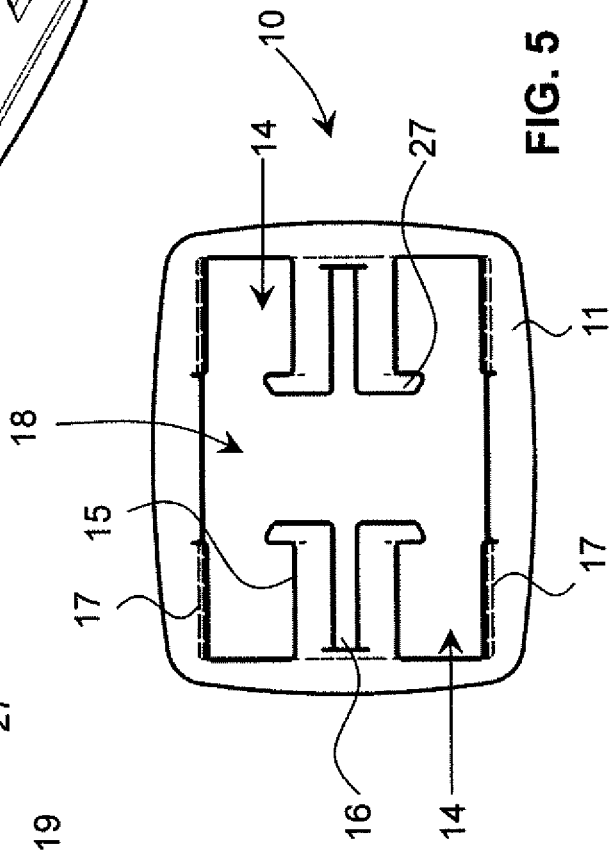
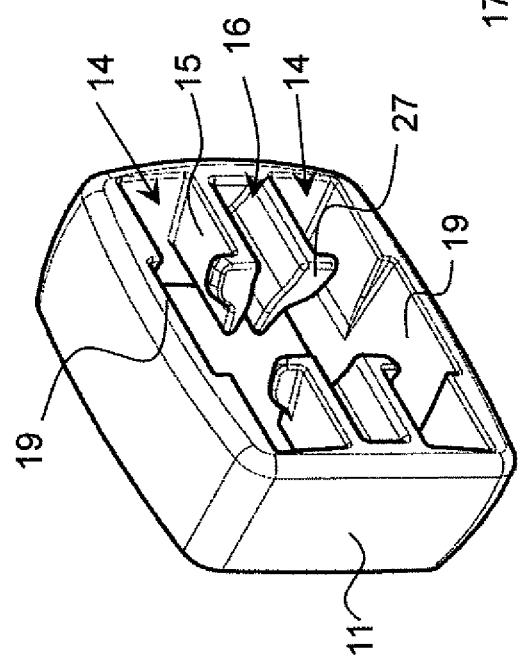

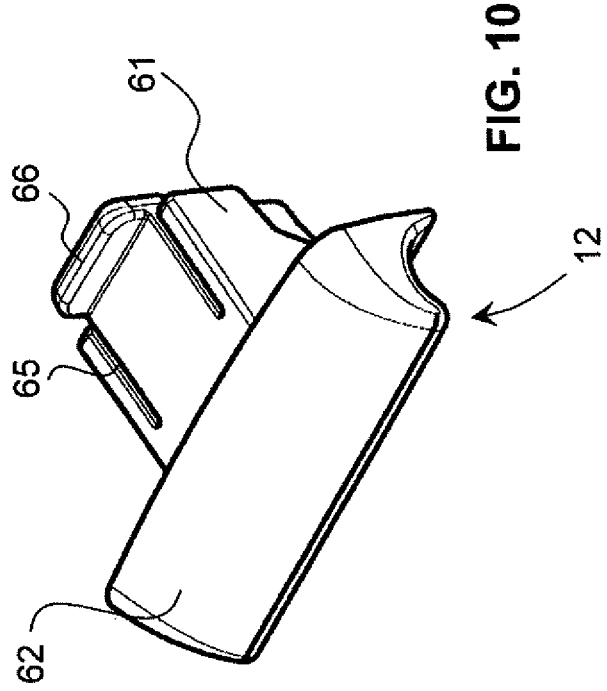
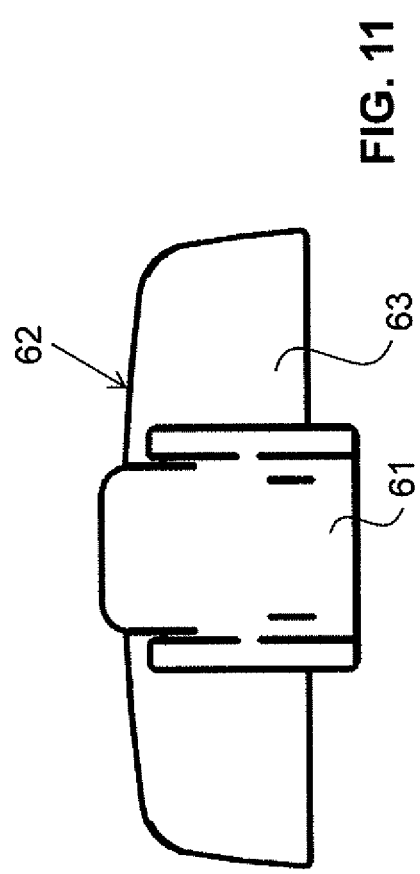
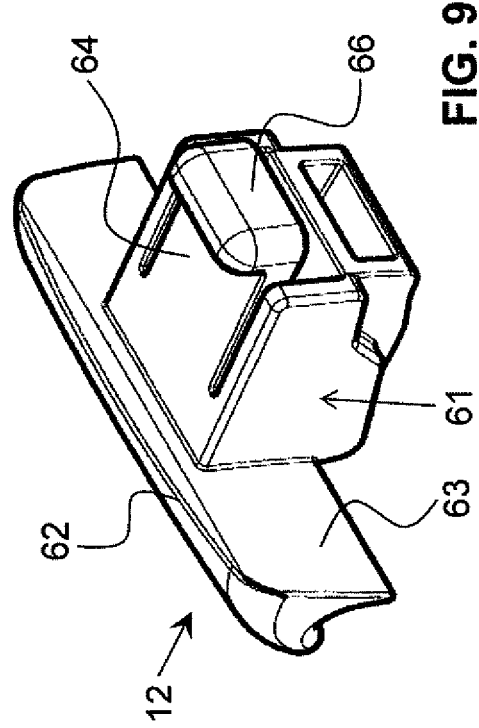

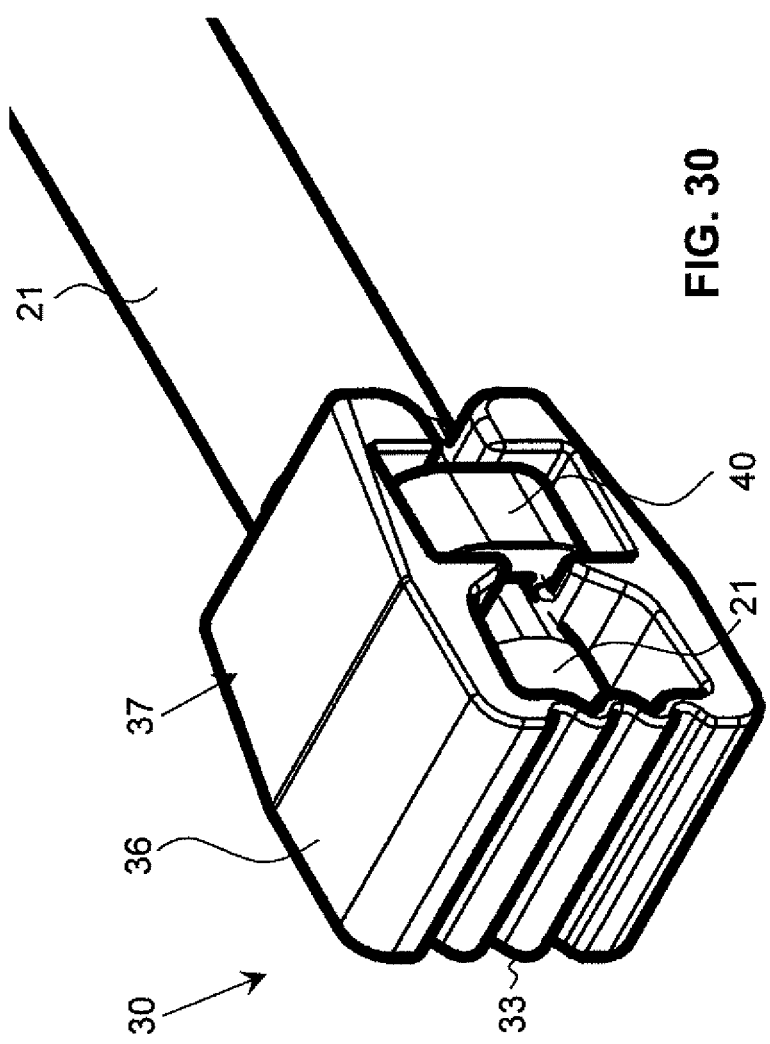

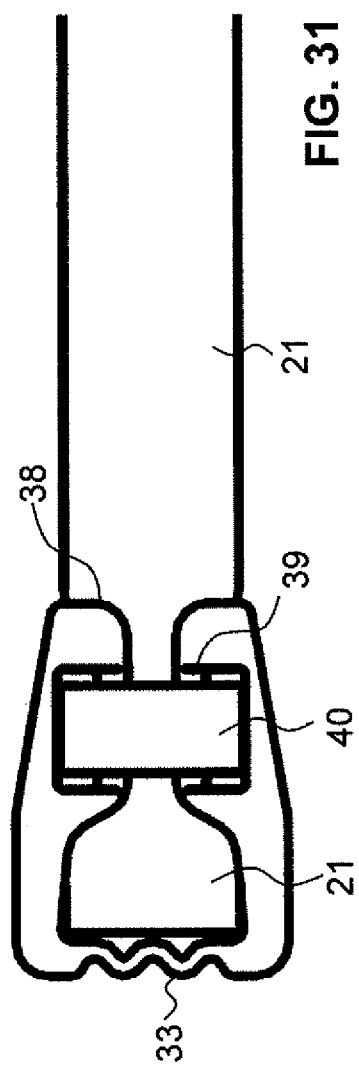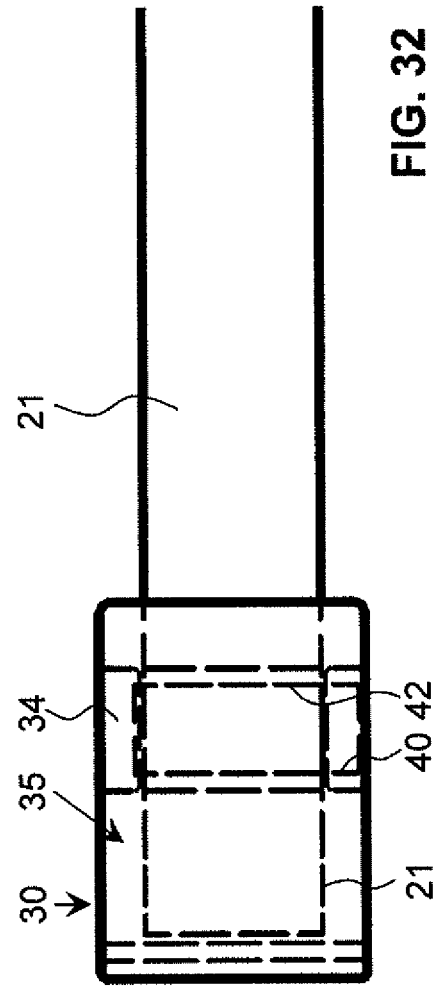

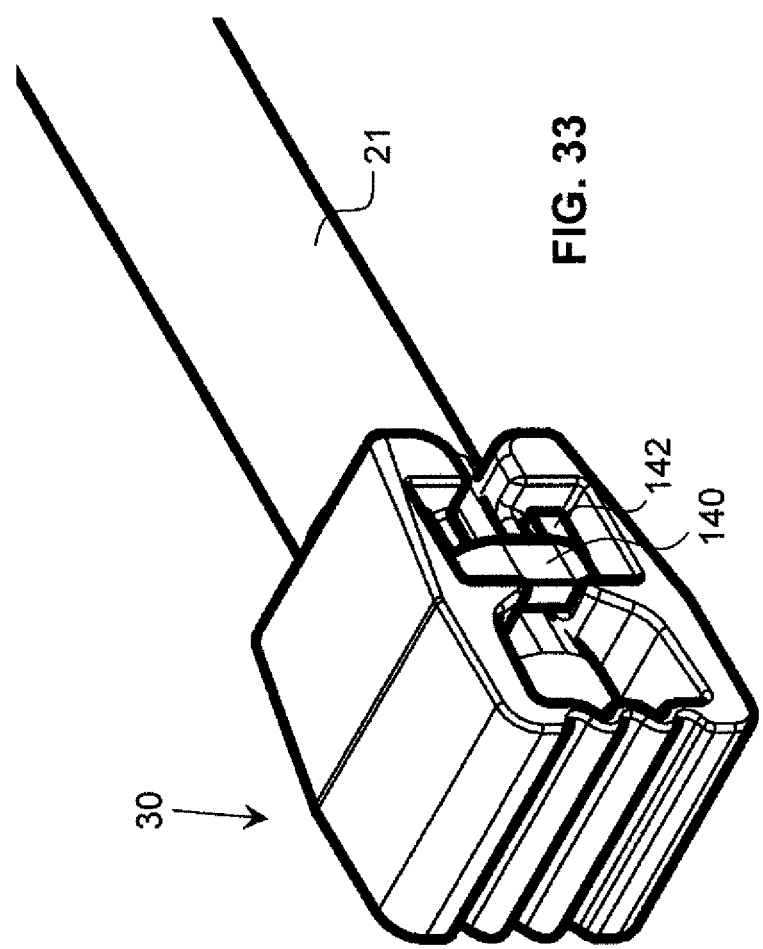

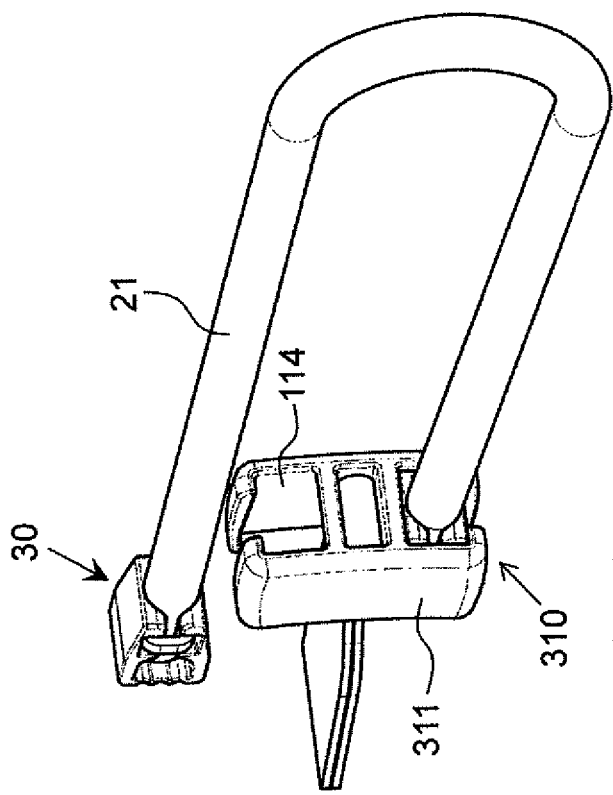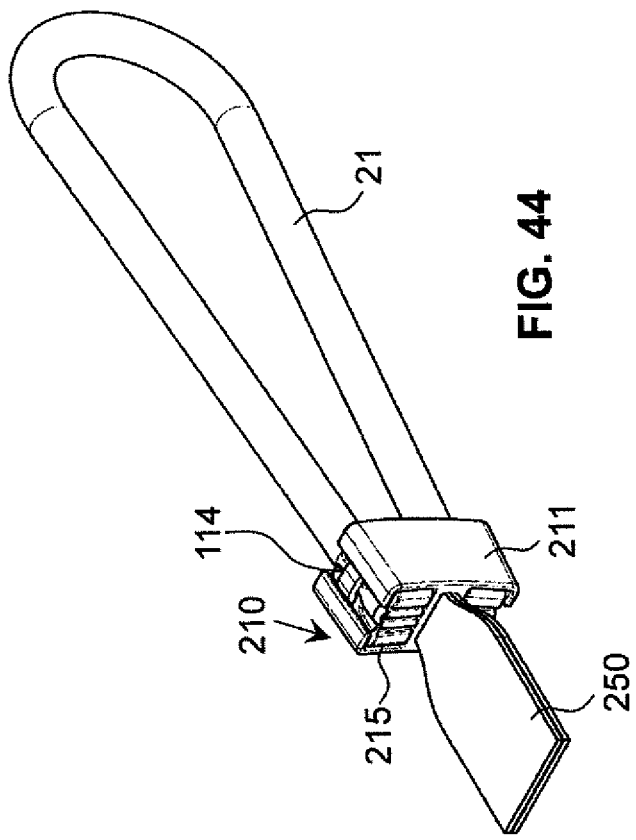

CABLE HOOK OF A FIXING DEVICE FOR A TRAMPOLINE

TECHNICAL FIELD

The present invention concerns a cable hook of a fixing device for a trampoline, and furthermore concerns such a fixing device for insertion in a rebound mat of the trampoline in the frame device of the trampoline.

PRIOR ART

Trampolines, e.g. mini trampolines which are used for exercise and therapy purposes, require a suitable oscillatable fixing system for fixing and clamping or mounting the rebound mat. In mini trampolines as known from DE 102 26 707, the rebound mat is ideally clamped with a combination of elastic elements and cable hooks instead of clamping using steel springs.

WO 2017/191144 A1 by the applicant describes a number of different cable hooks in which elastic elements with clamping elements at the free ends can be installed, wherein a flexible strap element of the rebound mat is guided on the opposite side of the cable hook and attached to the cable hook.

PRESENTATION OF THE INVENTION

A fundamental problem of mini trampolines is the compromise between the minimum possible external diameter of the surrounding frame, the largest possible diameter of the rebound mat, and the damping/oscillation determined by the length of the spring travel of the elastic elements.

Starting from the above-mentioned prior art, the object of the invention is to indicate an improved cable hook with which the usable length of the elastic cable element is optimised for a larger spring travel, without thereby reducing the diameter of the usable exercise area of the mat. Furthermore, an object of the invention is to protect the user of the trampoline from injury on the cable hooks and underlying fixing system in the event of stumbling due to the small size of the mini trampoline. At the same time, the system should be maintenance-friendly so that individual elastic elements and cable hooks can easily be exchanged. Also, the new solution should achieve a perceptibly better oscillation.

For this, a cable hook is provided for fixing a rebound mat to a trampoline frame by means of two elastic elements and at least one flexible strap element, wherein the cable hook has a housing with four receivers, wherein each elastic element has two free ends, each of which has a clamping element enlarging the periphery of the elastic element, wherein a clamping element of the (two) elastic element(s) can be inserted in each of said receivers. The cable hook has a cable hook body which is closed in the peripheral direction transversely to the fixing direction, wherein in each case two receivers are separated centrally by a receiving cavity in the cable hook body, through which a clamping element can be passed. The cable hook is then provided with two terminating pieces which can each be inserted in a respective receiving cavity and has a cover rounding pointing away from the cable hook housing and oriented towards each other.

In practical tests, it has also been found that the new clamping solution gives noticeably better service lives, i.e. in comparison with other solutions, the elastic elements tolerate 50 to 600 percent more oscillation cycles, and hence the customer benefits are increased firstly in relation to the sustainable quality of oscillation (health-promoting pulse) and also the durability of the elastic elements (usage costs).

The cable hooks, arranged closely next to each other in a circle with spoilers oriented towards the mat centre, form a visual and tactile warning marking for the user. They give the user a signal both optically and by contact with the feet, clearly indicating where the exercise area ends. The spoilers, which slope gently towards the exercise area, ensure that the textile edge zone rises elegantly in this region and lies neatly over the cable hooks.

According to tests, the use of a rubber strap without the conventional deflection on the mat side brings a significantly higher durability, in the region of millions of load cycles, in comparison with conventional fixing methods such as known e.g. from DE 20 2007 019 487 U1 or US 2010/0009812 A1 by the company Bellicon. In the present solution, a straight rubber strap starts at the fixing body, is guided about the frame tube and then runs straight into the second receiving position of the receiving body. Fixing elements are provided on the rubber cable ends which are able to bite more strongly as the tensile load increases. The fixing of the connecting loop as a flexible strap element in the body of the fixing element instead of behind the fixing element reduces the installation length between the last seam towards the mat centre (with which the loop is stitched to the mat) and the starting point at the cable hook, at which the elastic element (rubber cable) transforms into the free tensile section towards the trampoline frame. Also, this compact shape improves the hold, in particular by clamping the loop instead of wrapping it around a web section. The interruption of the loop clamping in the middle zone leads to a reduction in the installation space, so that more height is available for insertion of the crocodile clamps through the centre position between the two fixing points for the left and right loops of rubber cable.

A curved spoiler allows a gentle deflection of the mat edge or mat periphery beyond the fixing body. The structure of the cable hook as a closed box (receiver box) plus spoiler together gives a more compact and gentler shape which does not cause injury on contact due to stumbling. The resulting rim/ring of adjacent cable hooks with spoilers creates a prominent visual marking to delimit the safe exercise zone.

In a basic design, the cable hook for fixing a rebound mat to a trampoline frame by means of two elastic elements and at least one flexible strap element comprises a cable hook housing with four receivers. Elastic elements with clamping elements enlarging the periphery of the elastic element are inserted therein. The cable hook then has at least one receiving cavity arranged centrally between two of the receivers, and a terminating piece—which may also be called a spoiler—assigned to said receiving cavity. This terminating piece can be introduced into said receiving cavity and has a cover rounding which points away from the cable hook housing and is oriented towards the flexible strap element to be arranged centrally, and which optically and tactilely marks the edge of the rebound mat for the user.

Two receiving cavities may be provided in the cable hook body of the cable hook for two terminating pieces with cover roundings oriented towards the flexible strap element to be arranged centrally, i.e. one spoiler above and one spoiler below the strap element.

The receiving cavities may be through-openings, and the terminating pieces then preferably have a connection creating a form fit with the cable hook body. This may be a hook which engages at the edge of the cable hook body. The receiving cavities may also be blind holes, or may for example have an opening in the form of a cross slot, through which a knob may be pressed as a retaining element.

Advantageously, the spoiler can be used in a very reduced installation space if the cable hook body of the cable hook is closed in the peripheral direction transversely to the fixing direction. It then also has a higher structural integrity.

Then two receivers may be provided centrally from the receiving cavity in the cable hook body and form a common cavity, wherein a clamping element can be passed through the receiving cavity and moved sideways into one of the receivers. Thus the receiving cavity also becomes the passage space for the clamping elements of the elastic element and thereby further reduces the necessary installation height.

An insert slot for the flexible strap element is provided centrally between the upper and lower receivers, wherein said strap element forms a loop with a retaining rod which can be placed therein, wherein the insert slot tapers on the loop side towards the flexible strap element which has been brought together, so that the loop with the retaining rod which can be inserted therein comes to lie in the region of the cable hook body, advantageously in force fit when tension is exerted. Thus this loop then ends already inside and not behind the cable hook body so that further distance is saved in the radial direction, which benefits the cable length of the elastic element.

The upper and lower receivers may be tapered in the direction towards the elastic element forming the loop, so that the clamping elements come to lie in the region of the cable hook body, advantageously in force fit when tension is exerted. Here again, distance is saved on the cable element side in the radial direction of the trampoline, so that both tension elements (e.g. strap element and cable) come to lie with their fixing bodies (i.e. retaining rod and clamping element) in the cable hook body.

The tapering walls may be oriented substantially perpendicularly to the plane of the flexible strap element. They may also be oriented parallel to the plane of the flexible strap element, wherein in an embodiment with a common receiving cavity, on the one side they are formed only partially by the shoulder forming the lateral central termination.

A fixing system for fixing a rebound mat to a trampoline frame, wherein the rebound mat comprises a plurality of flexible strap elements connected thereto, uses a number of cable hooks according to one of the embodiments mentioned here corresponding to the number of flexible strap elements.

A trampoline with a rebound mat and a trampoline frame furthermore comprises a fixing system described here, by which the rebound mat is suspended in the trampoline frame.

Finally, a method for fixing a rebound mat to a trampoline frame uses the method steps of:

i) providing a fixing system described here, ii) passing a flexible strap element through a central insert slot in the cable hook for lateral insertion of a retaining rod in the loop opening of the flexible strap element and pulling the flexible strap element back into the insert slot, iii) looping an elastic element around a portion of the trampoline frame, iv) passing the first clamping element of the first elastic element through a receiving cavity of the cable hook and moving the elastic element with the lateral clamping element sideways into the one lateral receiver, v) passing the second clamping element of the first elastic element through a receiving cavity of the cable hook and moving the elastic element with the lateral clamping element sideways into the lateral receiver lying on the same side of the receiving cavity, vi) passing the first clamping element of the second elastic element through a receiving cavity of the cable hook and moving the elastic element with the lateral clamping element sideways into the remaining, opposite lateral receiver, vii) passing the second clamping element of the second elastic element through a receiving cavity of the cable hook and moving the elastic element with the lateral clamping element sideways into the remaining, opposite lateral receiver, viii) securing the two clamping elements of the two cable hooks in the assigned receiving spaces of the cable hook in order to clamp the rebound mat in the trampoline frame.

Where the above description of the embodiments usually refers to two elastic elements for each cable hook, the same or similar advantages also arise from one elastic element for each cable hook, since here too the insert slot for the strap element and/or the clamping element with its receiver can also be reached with individual elastic elements with one cable hook and two receivers.

Further embodiments are indicated in the dependent claims.

BRIEF DESCRIPTION OF THE DRAWINGS

Preferred embodiments of the invention are described below with reference to the drawings which serve solely for explanation and should not be interpreted restrictively. The drawings show:

FIG. 1 is a perspective view of an embodiment of a cable hook with two elastic elements and a flexible strap element;

FIG. 2 is a further perspective view of the embodiment from FIG. 1;

FIG. 3 is a perspective view of the cable hook as in FIG. 1;

FIG. 4 is a perspective view of the cable hook as in FIG. 2;

FIG. 5 is a front view of the cable hook looking onto FIG. 3;

FIG. 9 is a perspective view of the spoiler as may be used in FIG. 1 and therefore in FIG. 3;

FIG. 10 is a perspective view of the spoiler as may be used in FIG. 2 and therefore in FIG. 4;

FIG. 11 is a rear view of the spoiler from FIG. 9;

FIG. 30 is a perspective view of the clamping element from FIG. 27 with inserted rubber cable and clamp;

FIG. 31 is a side view of the clamping element in FIG. 30;

FIG. 32 is a top view of the clamping element from FIG. 30 with depiction of concealed elements;

FIG. 33 is a perspective view of the clamping element from FIG. 27 with inserted rubber cable and two clamps;

FIG. 44 is a perspective view of a further embodiment of a cable hook with a flexible strap element for only one elastic element; and FIG. 45 is a perspective view of another embodiment of a cable hook with a flexible strap element, also only for one elastic element, with an elastic element not yet fully inserted.

DESCRIPTION OF PREFERRED EMBODIMENTS

Figure 7:
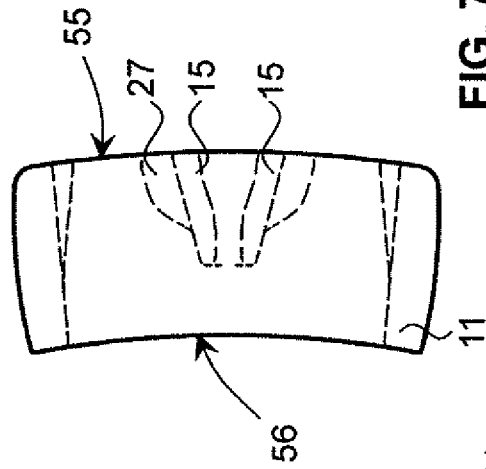
FIG. 7 is a side view of the cable hook from FIG. 1.

FIG. 1 shows a perspective view of an embodiment of a cable hook 10 with two elastic elements 20 and a flexible strap element 50, looking onto the side of the elastic element 20, while FIG. 2 shows a different perspective view of the embodiment according to FIG. 1 from the aspect of the flexible strap element 50.

Each elastic element 20 has a rubber cable 21 on which a clamping element 30 is placed at both free ends. The clamping elements 30 are described in more detail in connection with other figures. For the function of the fixing device comprising the cable hook 10, elastic element 20 and strap element 50, it is essential that the elastic element is folded back through 180° to half its length, and the two clamping elements 30 can be inserted in corresponding receivers 14 of the cable hook 10. These receivers 14 are described in more detail in connection with further figures. The body 11 of the cable hook 10, viewed from the side i.e. in the longitudinal direction of the inserted elastic element 20 and strap element 50, is rectangular and closed with roundings. Furthermore, in FIGS. 1 and 2, two spoilers 12 are inserted in the direction of the strap element 50 and are bent onto each other, starting flush with the upper and lower surface of the body 11, in the direction of the strap element 50, and thus surround this and cover a part thereof. The strap element 50 is attached to the rebound mat in the known fashion, in particular stitched, wherein the rebound mat—as will be seen below—may be arranged up to the region of the front edge of the spoiler 12. Each spoiler has a catch hook 13 with which it is held in the inner cavity of the body 11 of the cable hook; the separating face between the body 11 and spoiler 12 serves as a counter-face.

Figure 8:
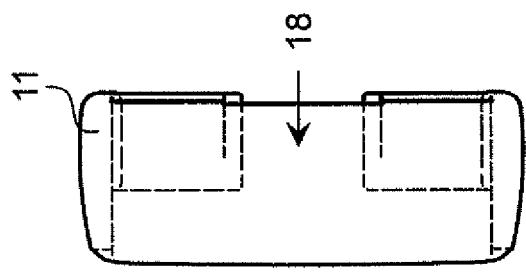
FIG. 8 is a top view of the cable hook from FIG. 1.
Figure 6:
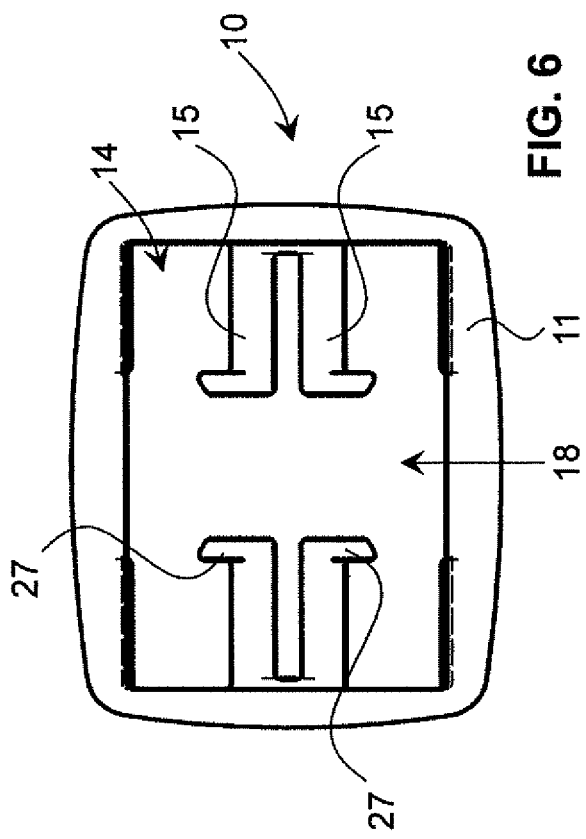
FIG. 6 is a rear view of the cable hook looking onto FIG. 4.

FIG. 3 shows a perspective front view of the (empty) cable hook from FIG. 1; FIG. 4 shows a perspective rear view of the cable hook as in FIG. 2 (in filled form); FIG. 5 shows a rear view of the cable hook looking onto FIG. 3; FIG. 6 shows a front view of the cable hook looking onto FIG. 4; FIG. 7 shows a side view of the cable hook from FIG. 1; and finally FIG. 8 shows a top view of the cable hook from FIG. 1.

The cable hook body 11 has four receivers 14 which are continuous in the longitudinal direction and arranged at the corners of the inner recess of the cable hook 10 which is otherwise closed on the periphery. The upper receiver 14 is separated from the lower receiver 14 by two ramps 15 arranged spaced apart from each other. The ramp 15 begins centrally in the direction of the strap element 15 (not inserted here) and rises slightly in the longitudinal direction, causing the receiver 14 to taper in this longitudinal direction. An insert slot 16 is provided between the two mutually opposing ramps 14. The ramps 14 are terminated laterally by a shoulder 27 so that each receiver 14 is completely closed on three sides, and on one side is closed up to one-third, Centrally, a double spoiler receiver 18 is present between the top side and bottom side of the body 11. This is known as a double receiver because two spoilers 12 are inserted in this space, one from the top and one from the bottom. Thus in the centre between the receivers 14, receiving ramps 19 are present which are evident on the side oriented towards the elastic elements 20 by a depression in the body 11. The shoulders or lateral guide ribs 27 guarantee that the clamping elements 30 are fixed in their positions relative to the middle. It is also possible that two separate spoiler receivers 18 are provided if the upper and lower delimiting walls of the insert slot are designed continuously and do not end at the shoulders 27. In the case of a common spoiler receiver 18 as shown in FIGS. 5 and 6, this could furthermore be described as two spoiler receivers 18 since the upper clamping elements 30 of the element 20 are guided through the upper portion and the lower clamping elements 30 of the element 20 are guided through the lower portion.

It is clear from FIG. 7 that, in a side view, the body 11 may be designed curved, wherein the curvature is oriented towards the trampoline centre. The side oriented towards the outer clamping frame has the convex outside 55, and the side oriented towards the trampoline middle has the concave inside 56, which the spoiler 12 adjoins directly when inserted.

Figure 13:
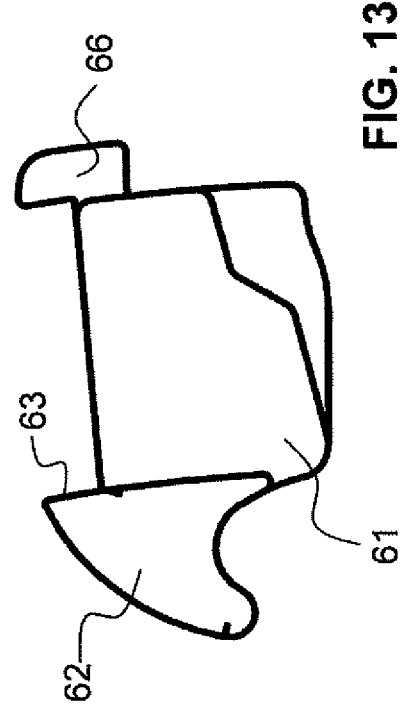
FIG. 13 is a side view of the spoiler from FIG. 9.
Figure 14:
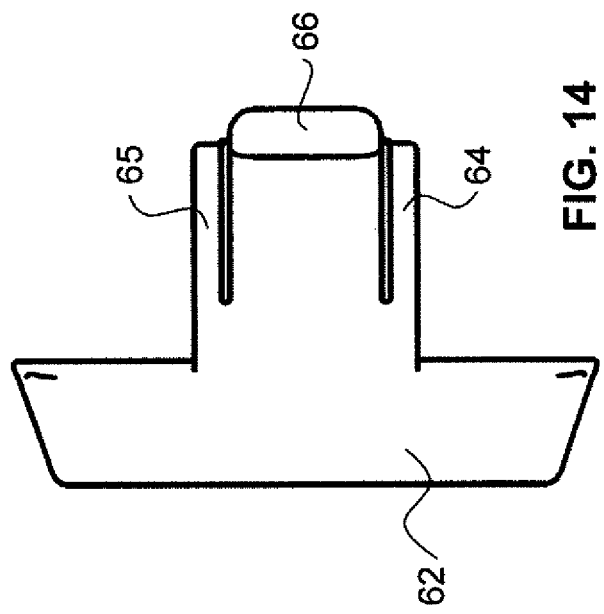
FIG. 14 is a top view of the spoiler from FIG. 9.
Figure 12:
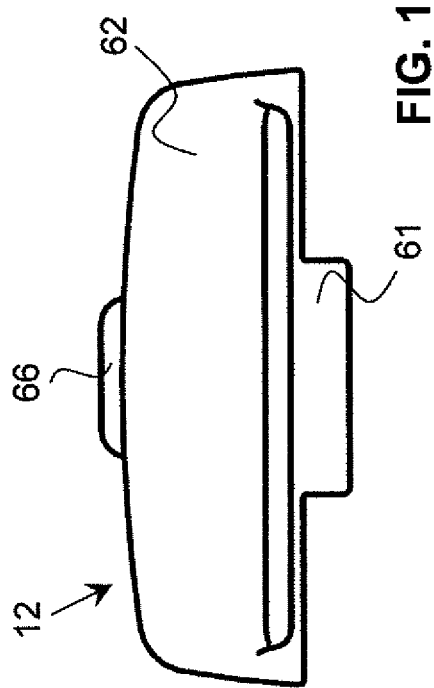
FIG. 12 is a front view of the spoiler from FIG. 9.

FIG. 9 shows a perspective view of the spoiler 12 as may be used in FIG. 1 and hence also in FIG. 3. FIG. 10 shows a different perspective view of the spoiler 12 as may be used in FIG. 2 and hence also in FIG. 4, FIG. 11 shows a rear view of the spoiler 12 from FIG. 9. FIG. 12 shows a front view of the spoiler 12 from FIG. 9. FIG. 13 shows a side view of the spoiler 12 from FIG. 9. FIG. 14 shows a top view of the spoiler 12 from FIG. 9.

The spoiler 12 is inserted from the front, from the side of the strap element 50. FIG. 9 shows the upper spoiler 12 with its central body which fills the upper receiving space in the spoiler receiver 18. This is to be arranged above the strap element 50. The rear wall 63 stands against the body 11 and prevents the clamping element 30 from being able to slip in the inward direction. For this, the central tongue as a latching element 64 is provided with hooks 66 (also designated element 13 in FIG. 1) which can engage behind the body of the cable hook 11. This latching element 64 is set back relative to the side walls of the spoiler body 62 through lateral slots 65.

Figure 15:
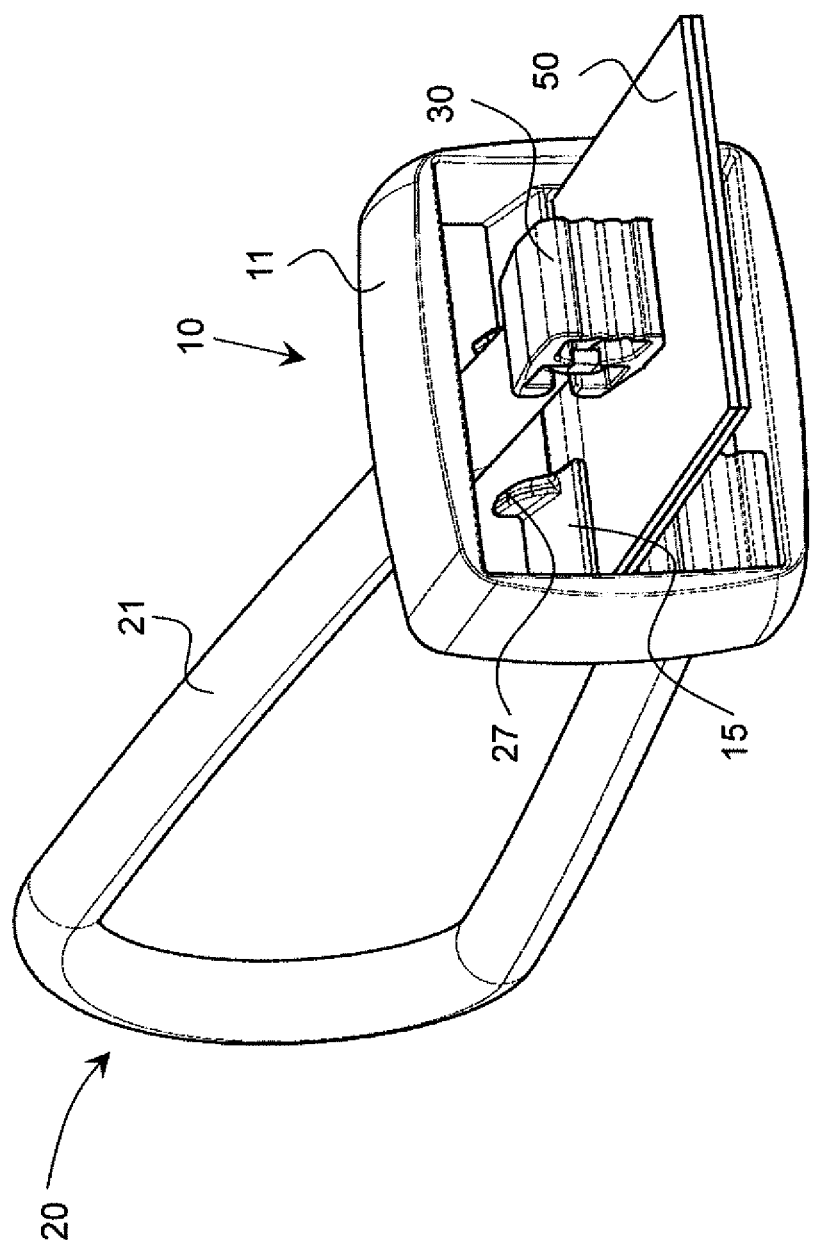
FIG. 15 is a perspective view of the cable hook as in FIG. 2, wherein the strap element is inserted and the first elastic element is inserted.
Figure 16:
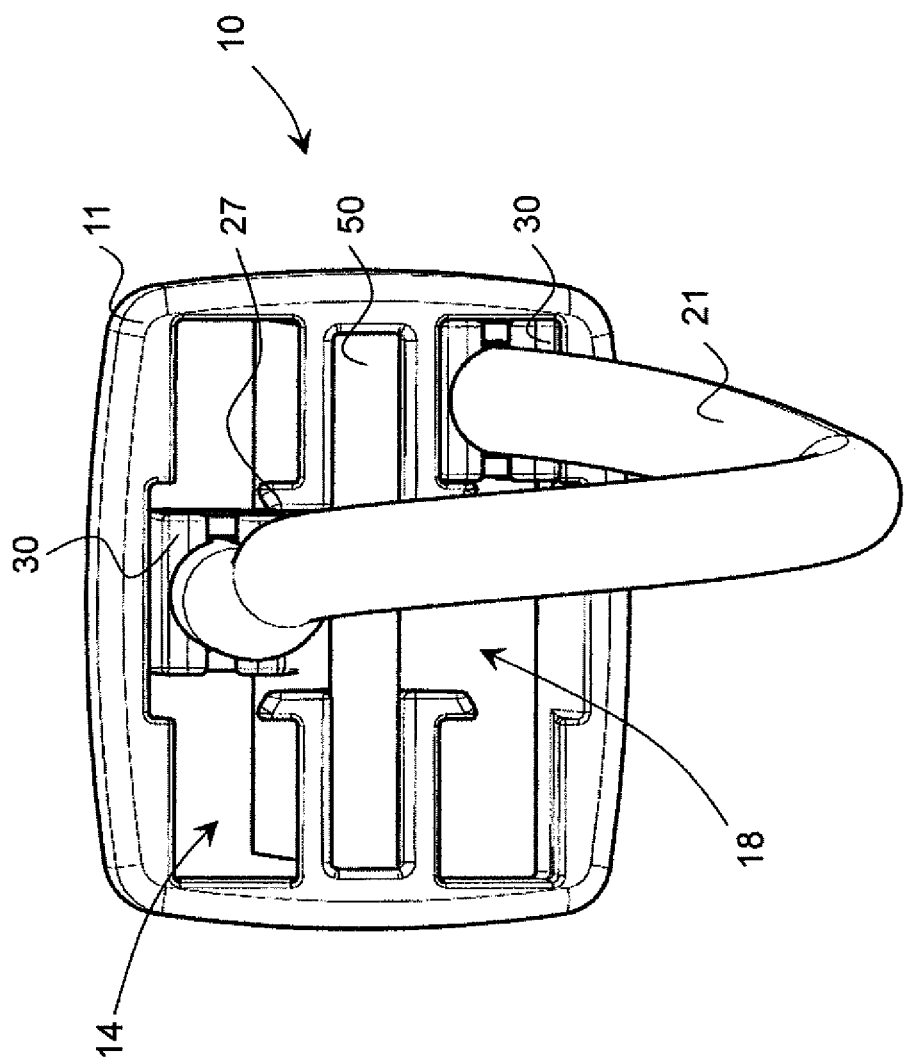
FIG. 16 is a view of FIG. 15 from the outside of the trampoline.

FIG. 15 shows a perspective view of the cable hook 10 as in FIG. 2, wherein the strap element 50 is inserted; a first elastic element 20 has already been inserted in the lower receiver 14, and the opposite end of the elastic element 20 is prepared for insertion in the upper receiving position (inserted through the central zone then moved sideways to an end position via the receiving position of the second end of the elastic element). FIG. 16 shows a view of FIG. 15 from the outside, viewed from the trampoline, and FIG. 17 shows a view of FIG. 15 from above.

Figure 17:
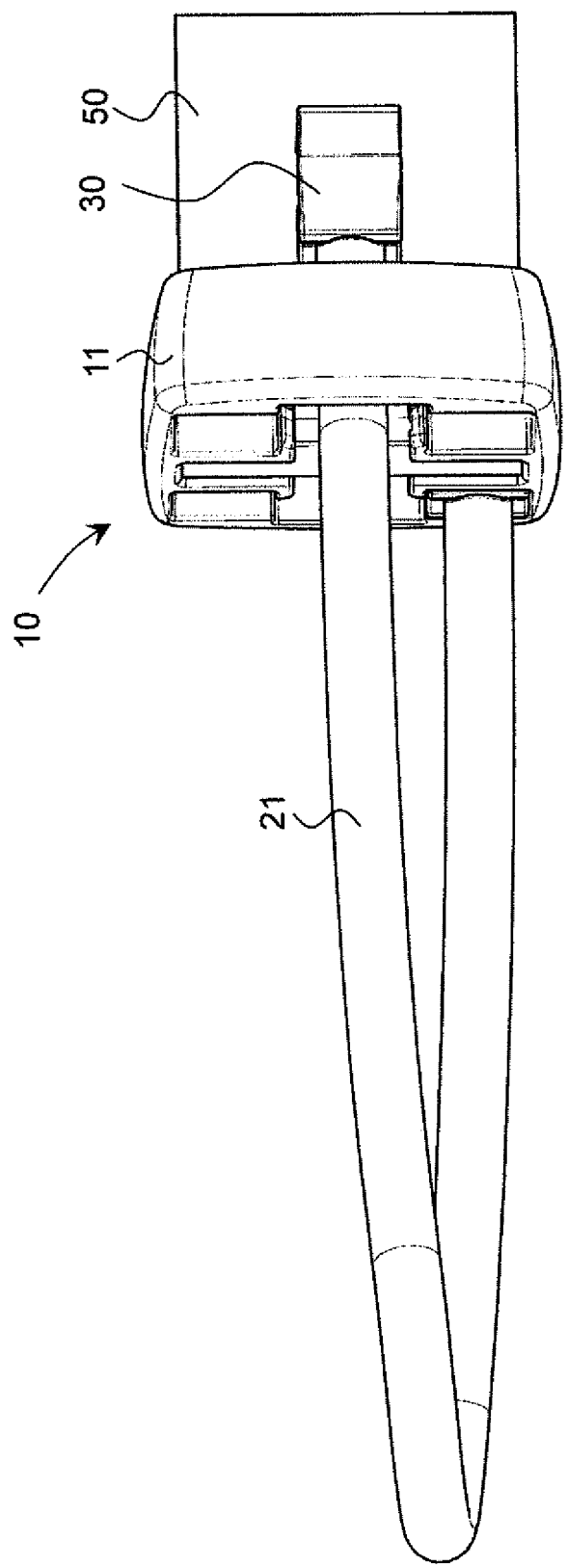
FIG. 17 is a view of FIG. 15 from above.

FIGS. 15 to 17 show a situation in which the flexible strap element has already been pushed through the insert slot 16 from the outside. The retaining rod 51 has been inserted in the slot 16 before the loop eye was drawn back so that flexible strap element 50 is locked. The insert slot may in particular widen at the end remote from the rebound mat in order to form a slot tapering in the inward direction, in which the loop eye is held firmly by force fit. It is advantageous here that the complete loop eye is drawn into the cable hook body 11 so that the force is already acting there and the loss of distance from the mat to the sprung element 20 is as small as possible. This is attached, in particular stitched, at the free end to the rebound cloth or rebound mat. A clamping element has already been inserted in the corresponding receiver 14. Before this, the clamping element was passed centrally from the outside through the receiver 14 in the otherwise closed body 11, moved sideways and positioned as the first clamping element 30; the second clamping element 30 in FIG. 15 has just been pushed through the upper central receiving space 14 and is now moved sideways to the left (looking onto the drawing page) behind the shoulder 27, in order to be locked in the upper left receiver (viewed onto the drawing page) since the clamping element 30 tapers conically in the direction of the elastic element 20 and thus corresponds to the form of the ramp 15.

Figure 18:
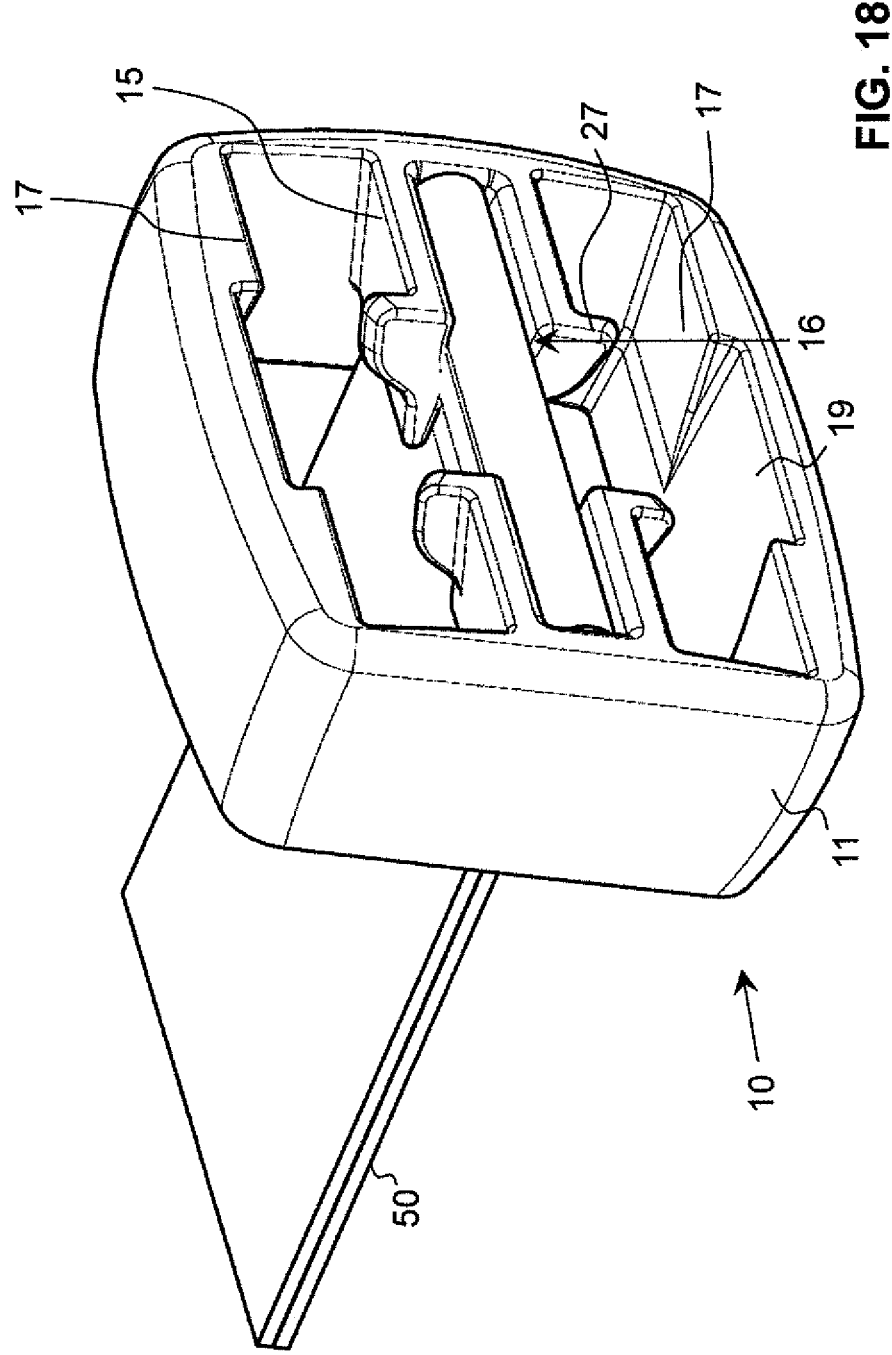
FIG. 18 is a perspective view of the cable hook from FIG. 1 with strap element inserted but without elastic element inserted.
Figure 19:
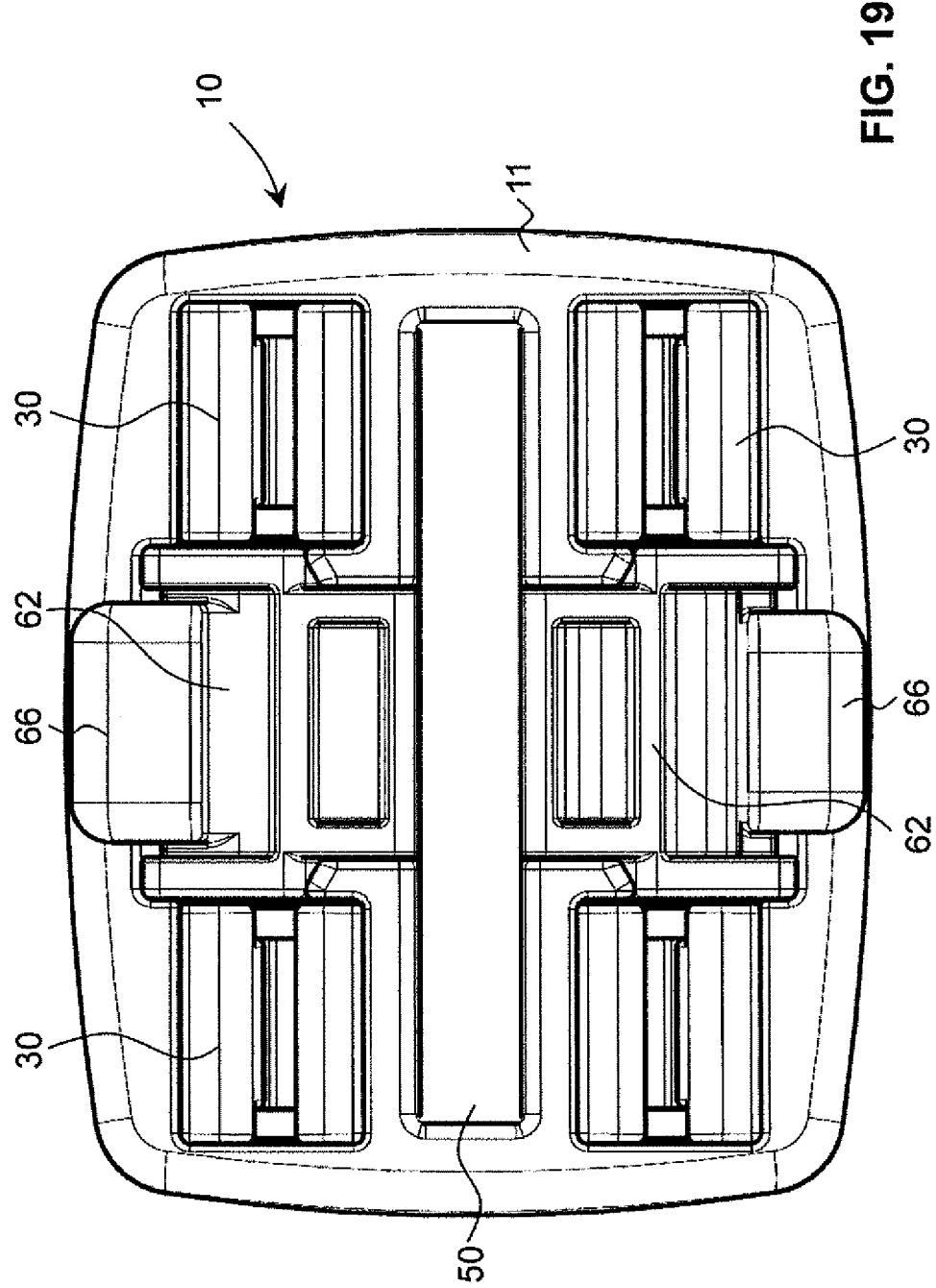
FIG. 19 is a front view from the outside of a trampoline onto the cable hook with four clamping elements and both spoilers inserted and strap element inserted according to FIG. 18 (the elastic elements/rubber cables in the clamping elements are not shown)
Figure 20:
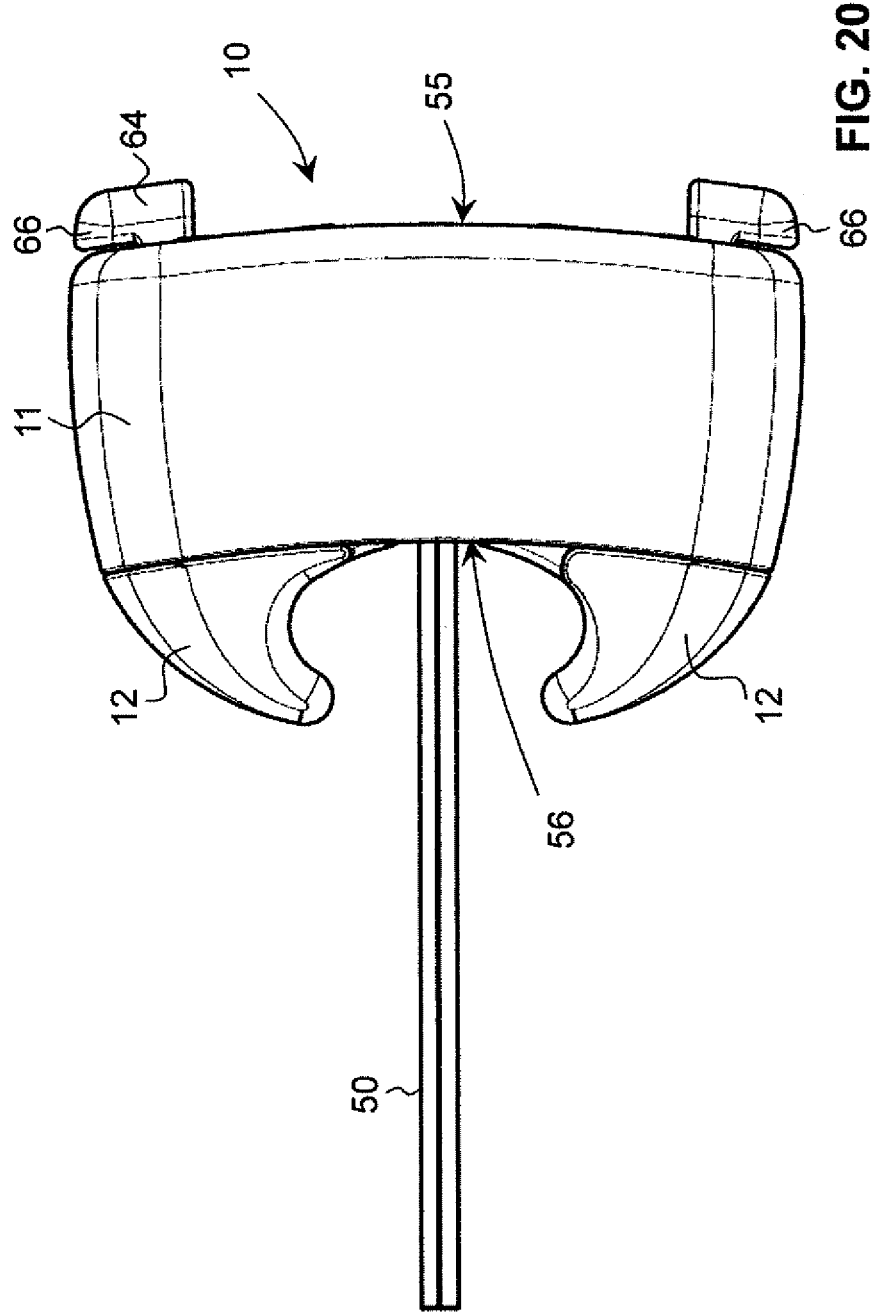
FIG. 20 is a side view of the view in FIG. 19.
Figure 21:
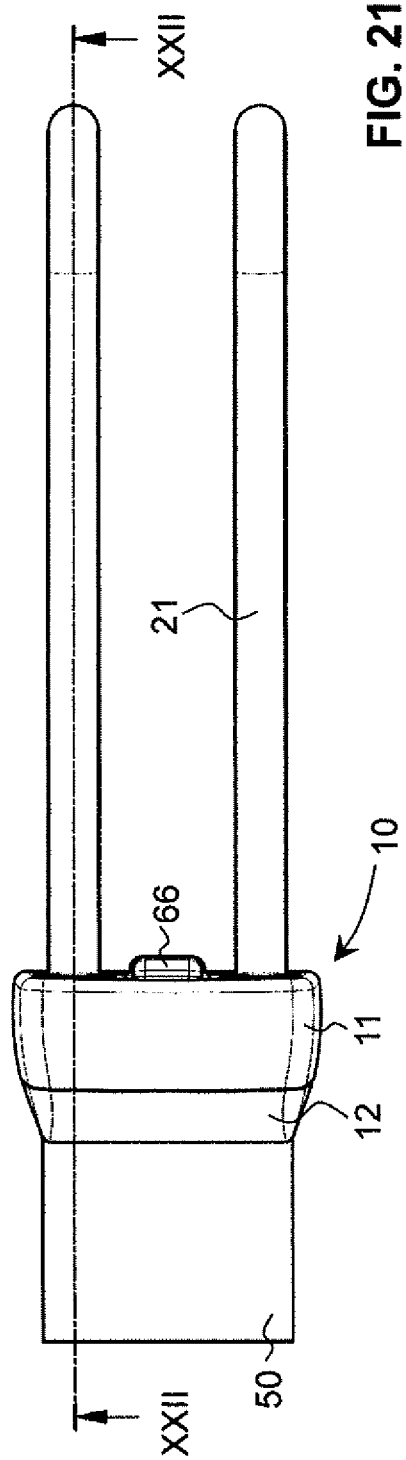
FIG. 21 is a top view of the view in FIGS. 19 and 20.
Figure 22:
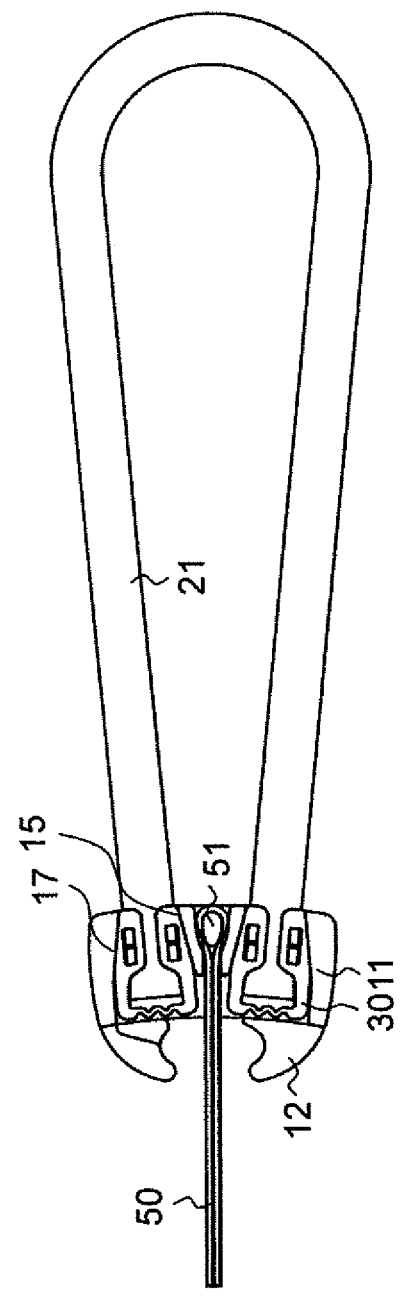
FIG. 22 is a sectional view along line XXII-XXII in FIG. 21.
Figure 23:
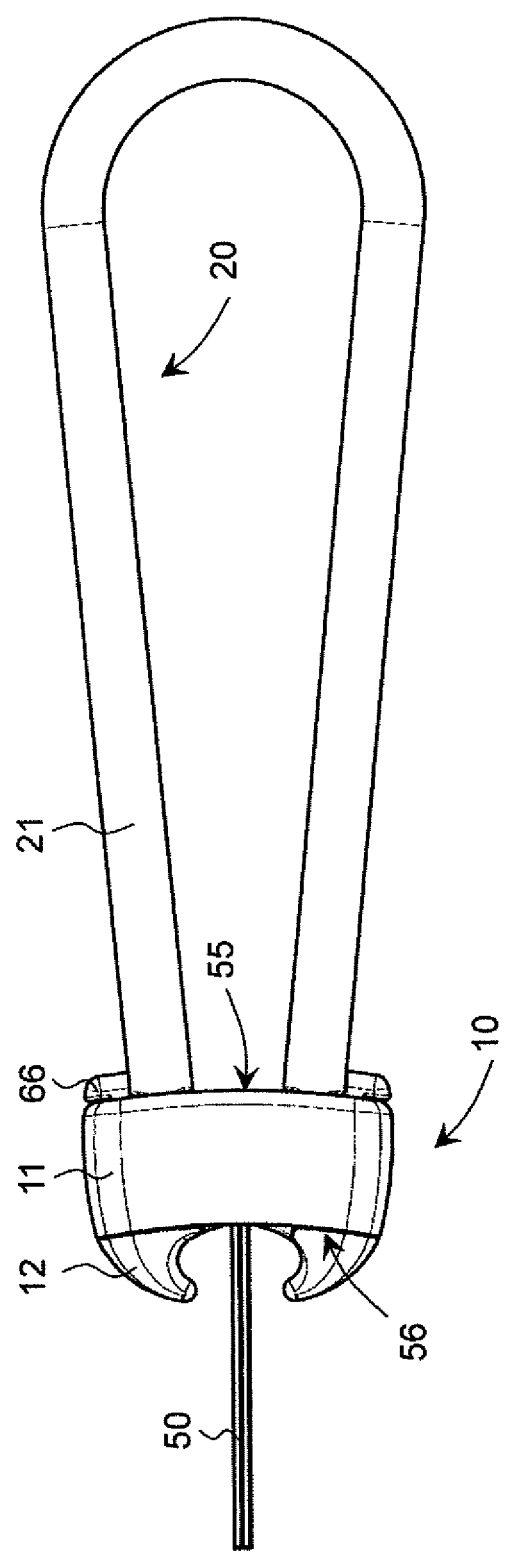
FIG. 23 is a side view of the view in FIG. 21.
Figure 24:
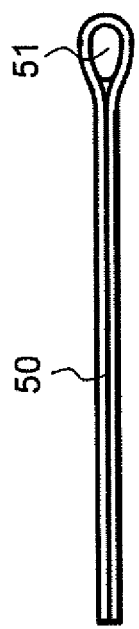
FIG. 24 is a side view of the flexible strap element with retaining rod inserted.
Figure 25:
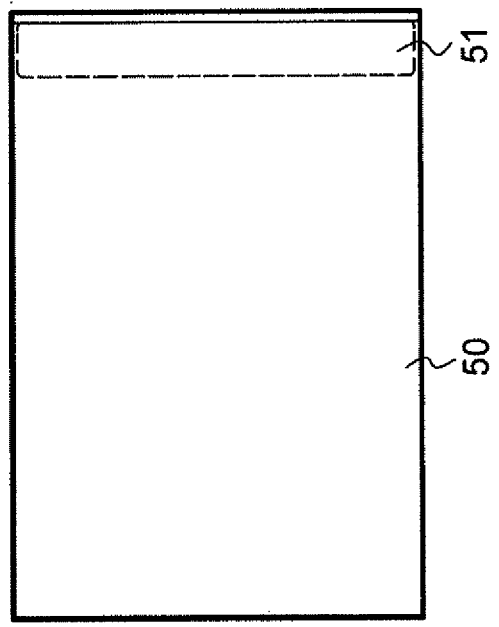
FIG. 25 is a top view of FIG. 24.
Figure 26:
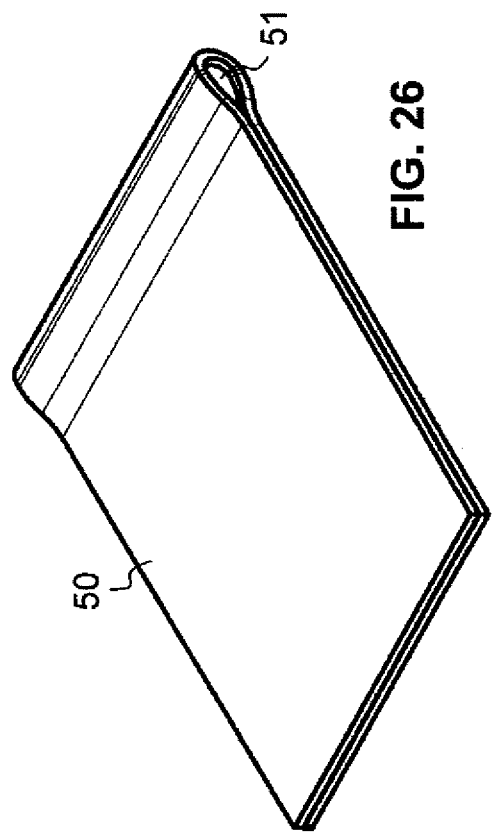
FIG. 26 is a perspective view of FIG. 24 showing how the flexible strap element is inserted in FIG. 2.

FIG. 18 shows a perspective view of the cable hook 10 from FIG. 1 with inserted strap element 50 but without inserted elastic element 20. FIG. 19 shows a front view from the outside of the trampoline onto the cable hook 10 with four inserted clamping elements 30—which, together with the rubber cables 21 (not shown), form the elastic elements 20—and with inserted strap element 50 according to FIG. 18. FIG. 20 shows a side view of the view in FIG. 19. FIG. 21 then shows a top view of the view in FIGS. 19 and 20, while FIG. 22 shows a sectional view along line XXII-XXII of FIG. 21. FIG. 23 shows a side view of the view in FIG. 21. FIG. 24 shows a side view of the flexible strap element 50 with inserted retaining rod 51. FIG. 25 shows a top view of FIG. 24, and FIG. 26 shows a perspective view of FIG. 24 in a manner which shows how the flexible strap element 50 is inserted in FIG. 2.

FIG. 18 shows only the inserted flexible strap element 50 in the insert slot 16. FIG. 19 then shows from the front, viewed from the outside of a trampoline, the completely filled space of the receiver 14 filled with four clamping elements 30 which belong to the two elastic elements 20 and make up the element but are not shown here. Because of this almost complete filling of the space enclosed by the body 11, the element has a high stability that is further reinforced by the spoilers 12 which, as shown in FIG. 20, protrude towards the flexible strap element 50 and are held on the opposite side by the hook 66 on the latching element 64, in a form fit and force fit, and in the body 11 of the cable hook 10. This procedure allows a small installation height of the cable hook body 11 since the clamping elements 30 are inserted in a space which can be used several times, and—like the flexible strap element 50—are locked in this cable hook body 11.

FIGS. 21 to 23 then show a sectional view, a top view and a side view of the cable hook 10 with elastic elements 20 and flexible strap element 50. The strap element 50 has the same width throughout, transversely to the longitudinal direction/fixing direction. Here, the strap element 50 may also be narrower towards the cable hook 10 and tapers in order to still provide a wide fixing strip at the mat or at the rebound cloth. FIG. 23 clearly shows how the flexible strap element 50 lies closely around and covers the cable hook 10.

Figure 28:
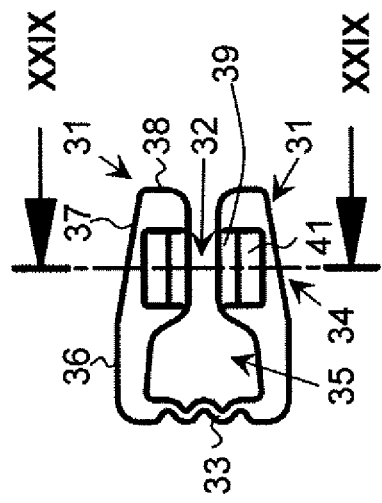
FIG. 28 is a side view of the clamping element from FIG. 27.
Figure 29:
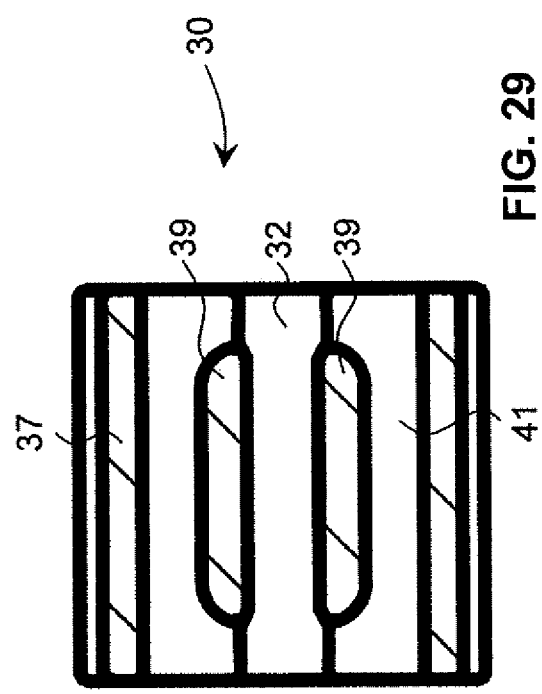
FIG. 29 is a sectional view along line XXIX-XXIX in FIG. 28.
Figure 27:
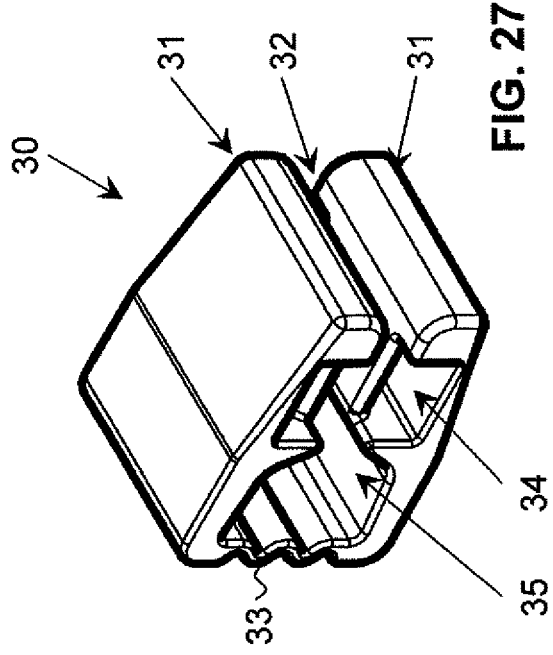
FIG. 27 is a perspective view of a clamping element for a cable hook according to exemplary embodiments of the invention.

FIG. 27 shows a perspective view of a clamping element 30 for a cable hook, e.g. the cable hook 10, according to exemplary embodiments of the invention. FIG. 28 shows an associated side view of the clamping element 30 from FIG. 27, and FIG. 29 shows a sectional view along line XXIX-XXIX of FIG. 28. This has already been depicted in FIGS. 1 to 26 in the use of elastic elements 20.

The clamping element 30 is C-shaped and has two free ends 31 with insert slot 32 in between. The free ends 31 are connected together via a hinge 33, in particular via an S-shaped film hinge. The insert slot 32 is followed by a region of the clip receiver 34 and an expansion space 35.

The side view of FIG. 28 more clearly shows that the C-shaped clamping element 30 adjacent to the hinge 33 has two outer walls 36 running parallel to each other, which then run towards each other in a taper 37. The taper 37 then forms a force fit with a complementary surface, such as the ramp 19 in the cable hook 10, for a tensile force exerted on the rubber cable 21. The diameter of an inserted rubber cable 21 is advantageously only slightly smaller than the width of the front surface 38, so that the rubber cable 21 is greatly compressed in the insert slot 32 in the region of the clip receiver 34. It can expand again in the expansion space 35 behind the region of the clip receiver 34, and substantially fills this. The hinge 33 also forms a stop for the advance of the rubber cable 21. On insertion of the rubber cable 21 under tensile stress, the free ends of the clamping element 30—which run tapering towards each other on the outside in the manner of a wedge—amplify the force on the two inner holding surfaces which are formed by the ramps 15 or 115 or 117.

In the sectional view through the clip receiver 34 in FIG. 29, the central insert slot 32 is surrounded by two webs 39 of the clip receiver 34, adjoined by transversely continuous clip spaces 41. These slots 41 extending through the clamping element 30 are provided to receive one or advantageously two clips 40, as shown in FIG. 30 or FIG. 33.

FIG. 30 shows a perspective view of the clamping element 30 from FIG. 27 with inserted rubber cable 21 and a clip 40. FIG. 31 shows a side view of the clamping element 30 from FIG. 30, and FIG. 32 shows a top view of the clamping element 30 from FIG. 30 depicting concealed elements. The clip 40 is a substantially C-shaped sprung steel element, wherein the free ends 42 (see FIG. 32) have such a length that they do not protrude from the clip space 41 on the opposite side. The mutual distance of the free ends 42, defined by the width of the connecting cover surface of the clip 40, is structured such that the clip 40 can be inserted under pressure in the slot 41 and either clamps inwardly or presses outwardly against the taper 37, wherein inward clamping is preferred. The clip 40 has a width which fills the length of the clip receiver 34 with some play (in the longitudinal direction of the rubber cable 21). The stops for the clip positioning are set back from the side outer wall so the clip and clamping wall form a flat surface.

The diameter of the clip space 41, i.e. the width of the slot or the thickness to which the rubber cable 21 is compressed in a direction parallel to the main plane of the hinge 33, may differ depending on the cable thickness. Then substantially the space existing in the clip receiver 34 changes, and with it the thickness of the web 39; the clip space 41 remains substantially the same since the clips 40 may be the same in all cases. These differences result when rubber cables 21 of different thickness classes are fitted because of different weights of the user. Such rubber cables 21 have slightly different diameters.

Figure 35:
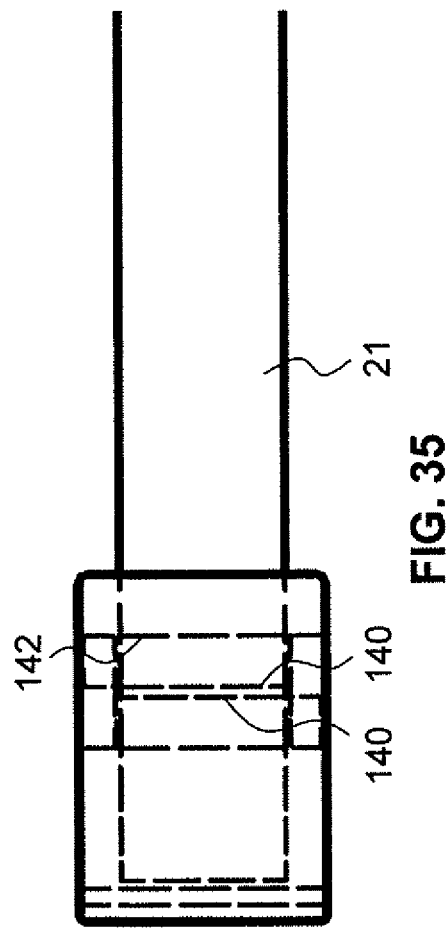
FIG. 35 is a top view of the clamping element from FIG. 33 with depiction of concealed elements.
Figure 34:
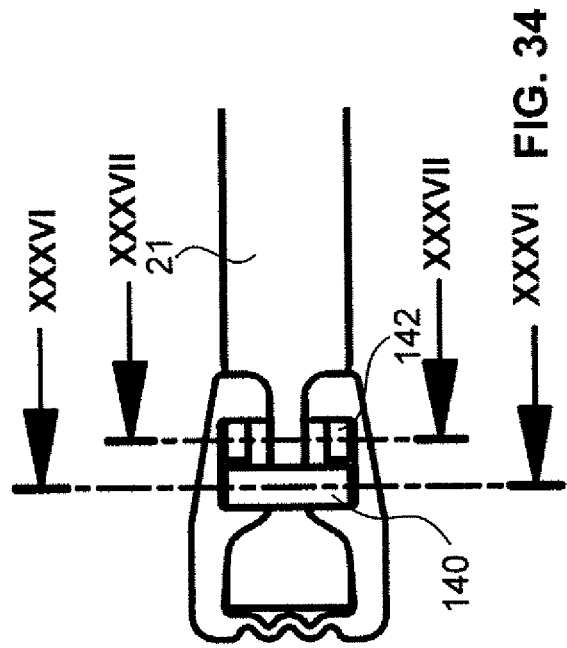
FIG. 34 is a side view of the clamping element from FIG. 33.
Figure 37:
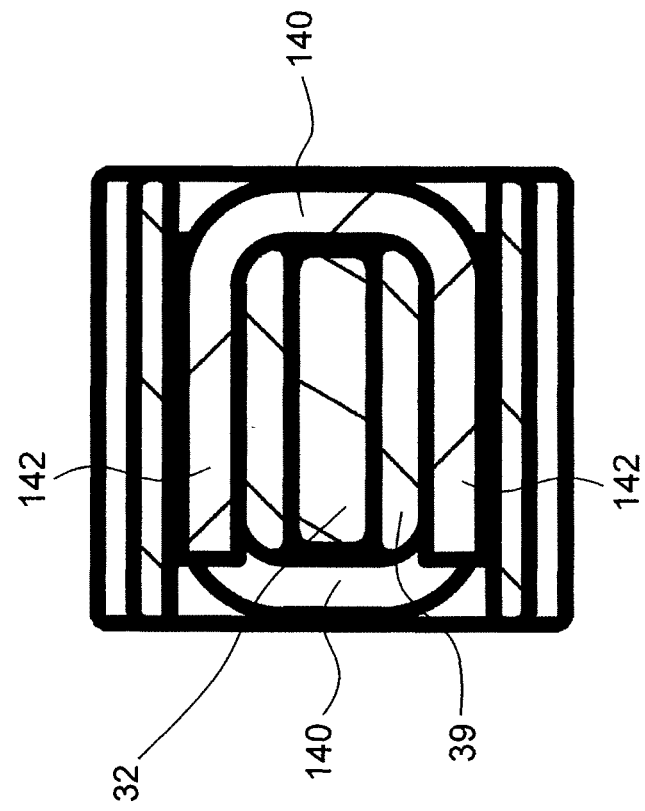
FIG. 37 is a sectional view along line XXXVII-XXXVII in FIG. 34.
Figure 36:
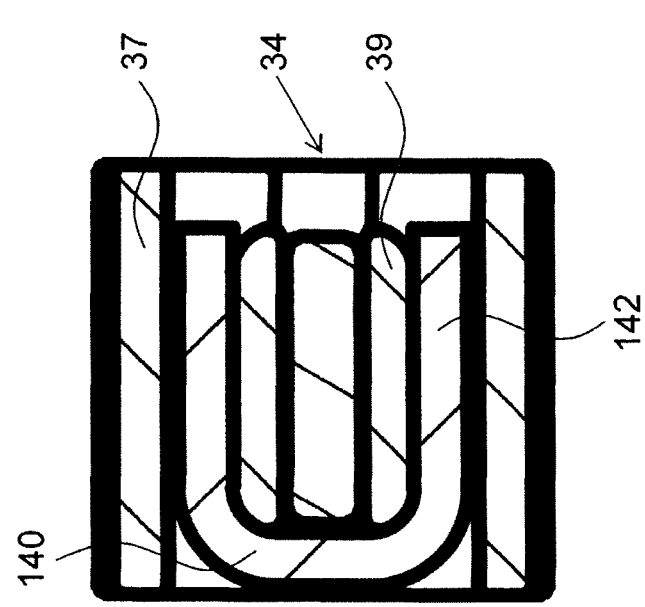
FIG. 36 is a sectional view along line XXXVI-XXXVI in FIG. 34.

FIG. 33 shows a perspective view of the clamping element 30 from FIG. 27 with inserted rubber cable 21 and two clips 140. FIG. 34 shows a side view of the clamping element 30 from FIG. 33, and FIG. 35 shows a top view of the clamping element 30 from FIG. 33 depicting concealed elements. In addition, FIG. 36 shows a sectional view along line XXXVI-XXXVI in FIG. 34, and FIG. 37 shows a sectional view along line XXXVII-XXXVII in FIG. 34. The difference between the clamping elements 30 according to FIG. 30 and FIG. 33 is that, in the embodiment according to FIG. 30, the rubber cable is fixed by one wide clip 40, whereas in FIGS. 33 to 35, the rubber cable 21 is fixed by two clips 140 of approximately half the width, which are preferably introduced into the clip space 41 from opposite sides. Otherwise, the exemplary embodiments are configured identically. FIG. 36 shows the U-shaped form of the clip 140, wherein the length of the free ends 142 is dimensioned such that they extend up to the edge of the webs 39. The clips 40 or 140 are advantageously inserted by closing the spring steel bracket.

Figure 38:
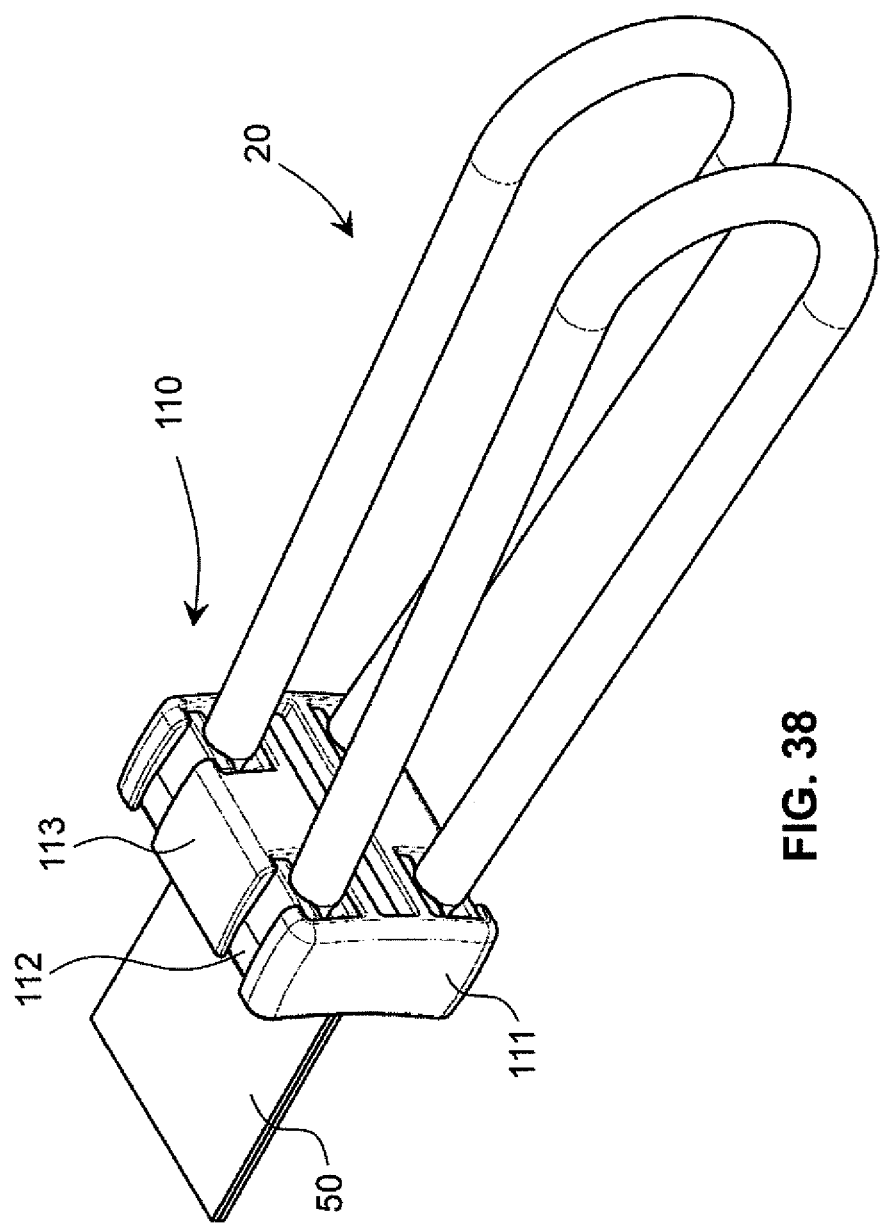
FIG. 38 is a perspective view of a further embodiment of a cable hook with two elastic elements and a flexible strap element.
Figure 39:
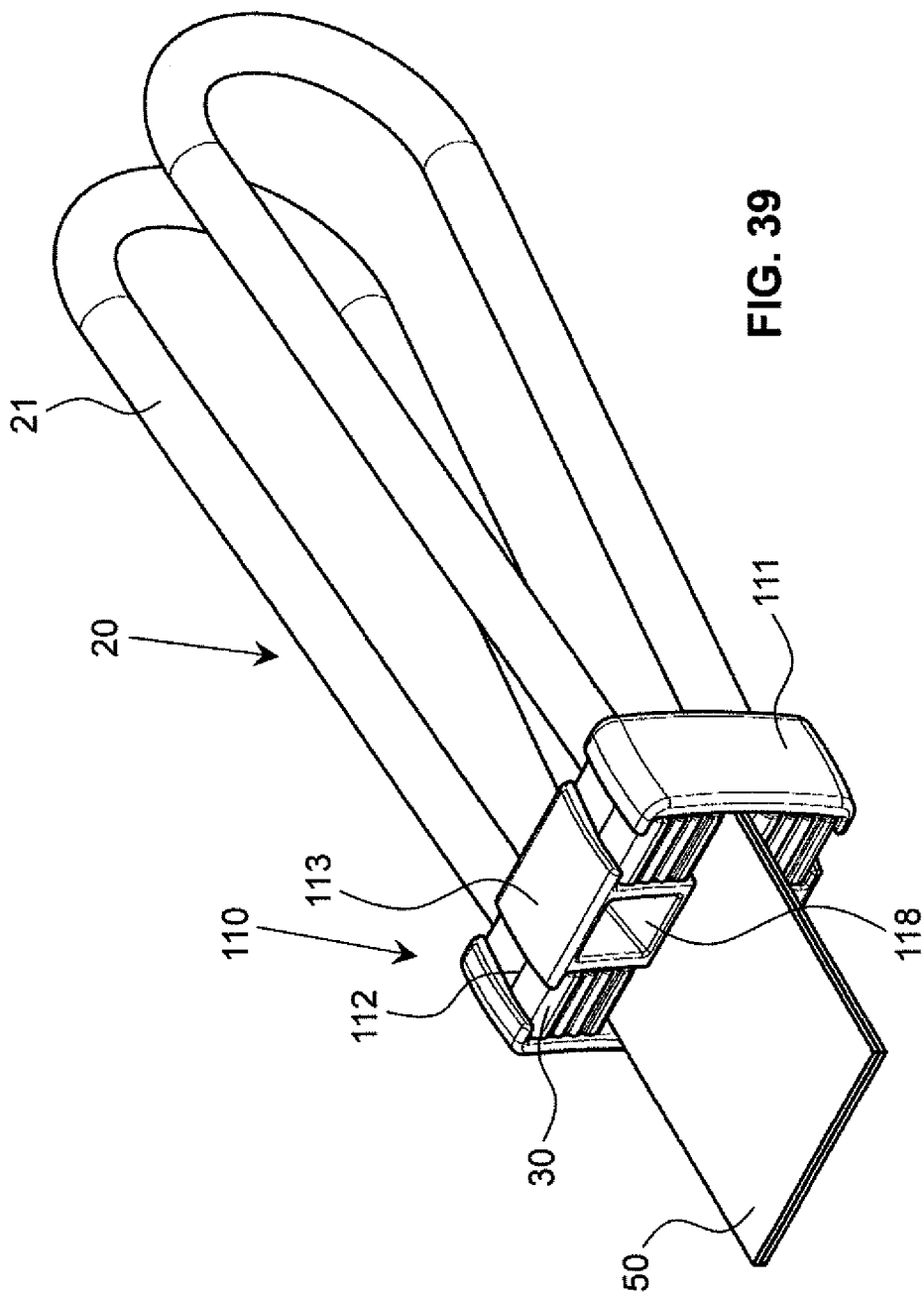
FIG. 39 is a further perspective view of the embodiment from FIG. 38.
Figure 40:
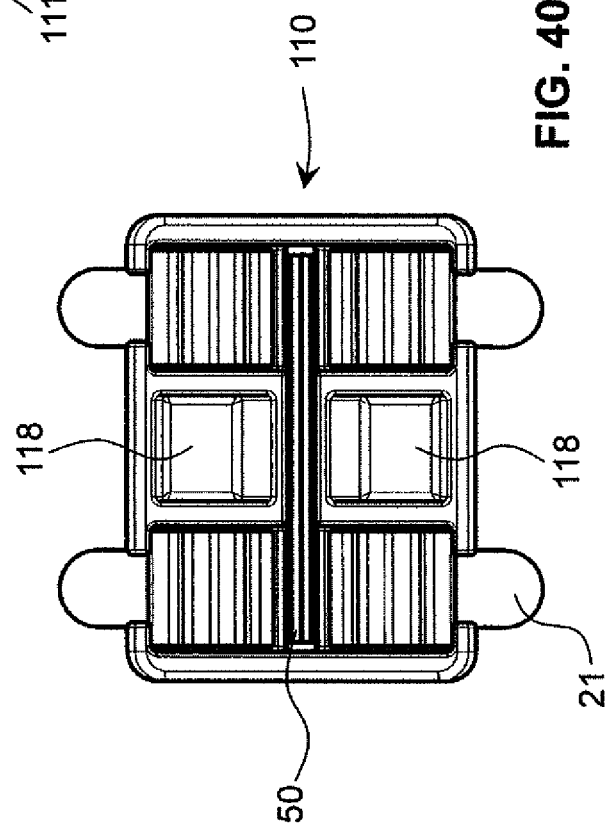
FIG. 40 is a front view, from the trampoline centre, of the cable hook from FIG. 38.

FIG. 38 shows a perspective view of a further embodiment of a cable hook 110 with two elastic elements 20 and a flexible strap element 50. FIG. 39 shows a further perspective view of the embodiment in FIG. 38, and FIG. 40 shows a front view from the trampoline centre onto the cable hook 110 according to FIG. 38. The further perspective view in FIG. 41 of the cable hook 110 according to FIG. 38, with only one elastic element 20 not yet completely inserted, also belongs to the explanation.

Figure 41:
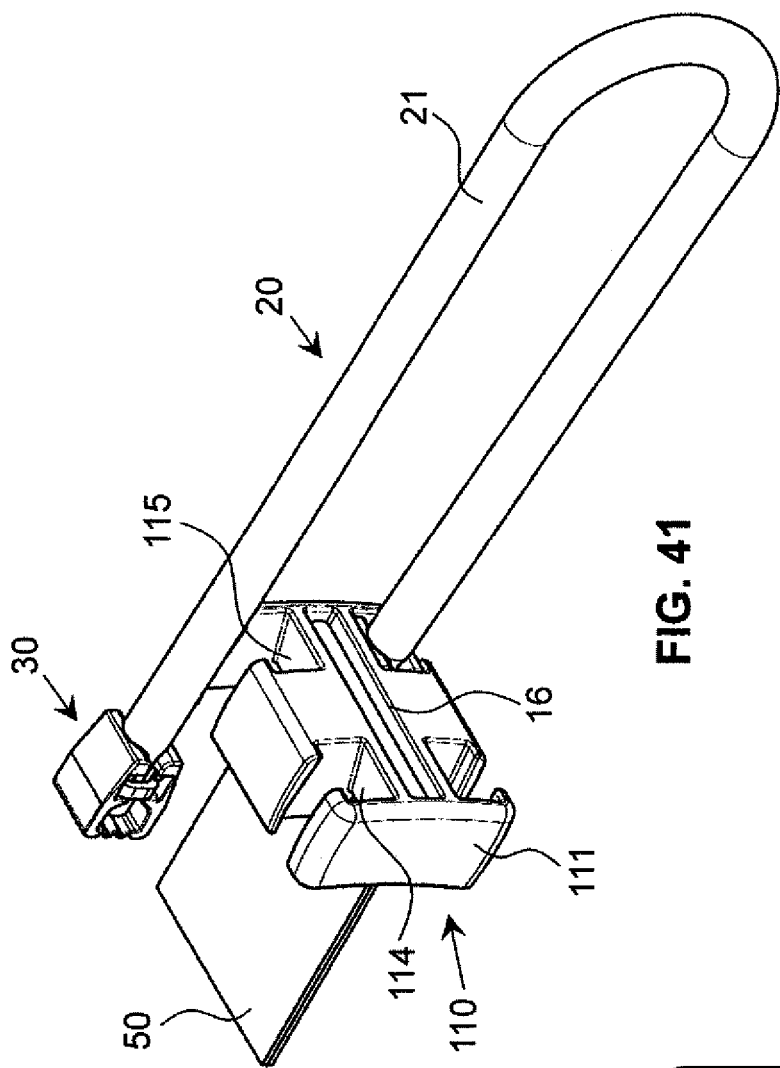
FIG. 41 is a further perspective view of the cable hook from FIG. 38 with only one elastic element not yet completely inserted.

The numbering of the reference signs indicates that the same elastic elements 20 and the same flexible strap element 50 may be used. The central insert slot 16 is identically configured in respect to dimensions, and the receivers 114 have the same shape (with respect to the lower ramp 150) as in the cable hook 10. The difference is that the body 111, in contrast to the peripherally closed body 11, is open towards the receivers 114 at the four hook insert slots 112, and for this has a central region 113 which constitutes the inner lateral delimitation for the cable insert slots 112. For this, the slot 16 for the flexible strap element 50 in the middle of the body 111 is also covered. Each individual clamping element 30 is passed individually through the side insert slot 112 on site, wherein as depicted in FIG. 41 the rubber cable 21 is pressed through the cable insert slot 112 while the clamping element is in the region of the flexible strap element 50, and is then pulled into the opening against the ramp 115.

Figure 42:
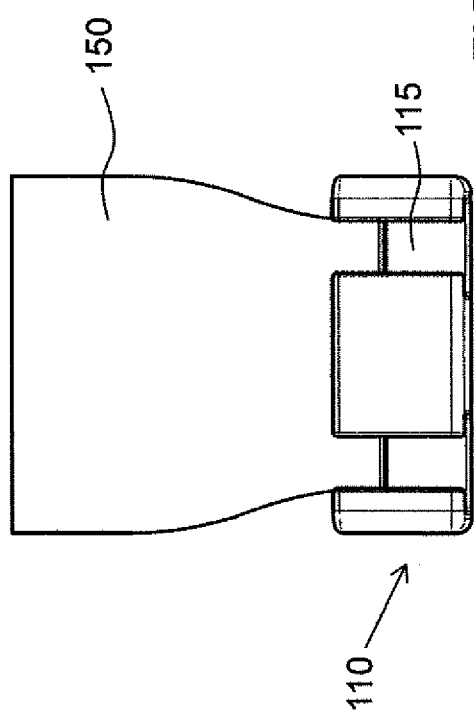
FIG. 42 is a top view of a cable hook according to FIG. 38 with another flexible strap element.

FIG. 42 shows a top view of a cable hook 110 according to FIG. 38 with another flexible strap element 150. This strap element 150 is attached to the trampoline mat with a wider tab, while it tapers towards the cable hook 110.

Figure 43:
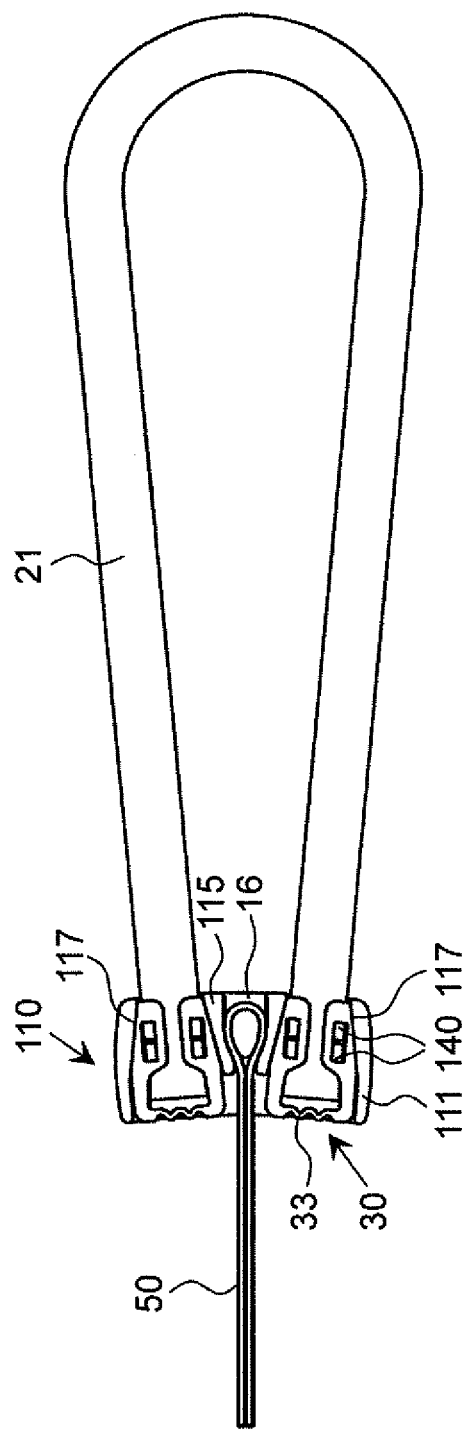
FIG. 43 is a cross-sectional view of the cable hook from FIG. 38.

FIG. 43 shows a cross-sectional view of the cable hook 110 from FIG. 38 with inserted clamping elements 30 with two clamps 140. The inner ramp 115 lies opposite an outer ramp 117, which corresponds to a thickening of the cable hook body 111 in the direction of the elastic element 20, and the outer ring of the trampoline, in order to hold the tapering body of the clamping element securely against tension.

In principle, it is possible to insert spoilers 12 in the central blind holes 118 so that these blind holes function as spoiler receivers in the same manner as those with reference sign 18. The spoilers to be inserted are then pressed by force fit into the opening 118. It is also possible for the spoilers to reach with a flat leaf over the central region 113 and hook onto the opposite side of the cable hook body 111.

The blind holes 118 may also be through-openings so that spoilers 12 may be pushed through these in the same manner as in FIGS. 1 and 2, and can be fixed by a latching hook 13 or 66 which has been passed through the opening.

In a derivative of the cable hook 110, the ramps 115 and 117 may also be arranged transversely or horizontally, as shown in the exemplary embodiment according to FIG. 44.

FIG. 44 shows a perspective view of a further embodiment of a cable hook 210 with a flexible strap element 250 for only one elastic element 30, and FIG. 45 shows a perspective view of another embodiment of a cable hook 310 with a flexible strap element 250, also for only one elastic element 30.

In FIGS. 44 and 45, the cable hook body 211 or 311 has only two receivers 214 or 114 for the two ends of the cable element 21. The receiver in FIG. 45 may be configured in the same way as in the cable hook 110. In the example of FIG. 44, the receiver 214 is different because the cable hook has been inserted in a fashion rotated through 90° relative to the other embodiments, i.e. the taper extends sideways and not from top to bottom. Thus the side walls of the cable hook body 211 are also the ramps 215. The flexible strap element 250 is narrower and widens towards the rebound mat. In FIG. 45, the cable hook body 311 corresponds to one "half" of the cable hook body 111; the receiver 114 is configured identically.

LIST OF REFERENCE SIGNS

10 Cable hook
11 Body of cable hook
12 Spoiler or roundings
13 Latching hook
14 Receiver
15 Ramp
16 Insert slot
17 Outer ramp
18 Spoiler receiver
19 Receiving ramp
20 Elastic element
21 Rubber cable 27 Shoulder
30 Clamping element/crocodile clamp
31 Free end
32 Insert slot
33 Hinge
34 Clip receiver
35 Expansion space
36 Parallel outer walls
37 Taper
38 Front face
39 Web
40 Clip
41 Clip space/slot
42 Free end
50 Flexible strap element
51 Retaining rod
55 Outside of body
56 Inside of body
61 Central body
62 Spoiler body
63 Straight rear wall
64 Latching element
65 Slot
66 Hook
110 Cable hook
111 Body
112 Insert slot
113 Central region
114 Receiver
115 Ramp
117 Outer ramp
118 Central blind hole/spoiler receiver
140 Clip
142 Free end
150 Flexible strap element
210 Cable hook
211 Cable hook body
215 Inner ramp
250 Flexible strap element
310 Cable hook
311 Cable hook body

The invention claimed is:

1. A cable hook fixing a rebound mat to a trampoline frame by means of a first and a second elastic element, wherein each elastic element has two enlarged free ends, and a flexible strap element, wherein the cable hook comprises
  a cable hook housing having
    four elastic element receivers positioned as two upper and two lower elastic element receivers side by side and each adapted to receive one of the enlarged free ends of the first and second elastic elements,
    a first spoiler receiver arranged centrally between the two upper elastic element receivers, and
    a first spoiler assigned to the first spoiler receiver, which first spoiler is adapted to be inserted in the first spoiler receiver and has a cover rounding which points away from the cable hook housing and is oriented towards the flexible strap element to be arranged centrally of the cable hook housing and is covering a portion of the flexible strap element outside the cable hook housing.

2. The cable hook according to claim 1, wherein the first spoiler receiver is a through-opening in the cable hook housing, and that the first spoiler has a connection creating a form fit with the cable hook housing.

3. The cable hook according to claim 1, wherein a second spoiler receiver is provided in the cable hook housing of the cable hook arranged centrally between the two lower elastic element receivers for receiving a second spoiler with a cover rounding oriented towards the flexible strap element to be arranged centrally of the cable hook housing and is covering a portion of the flexible strap element outside the cable hook housing on an opposite side of the flexible strap element from the first spoiler.

4. The cable hook according to claim 3, wherein the second spoiler receiver is a through-opening in the cable hook housing, and that the second spoiler has a connection creating a form fit with the cable hook housing.

5. The cable hook according to claim 1, wherein the cable hook housing of the cable hook is closed in a circumferential direction.

6. The cable hook according to claim 5, wherein two upper and the two lower elastic element receivers are provided on both sides of a centrally provided first spoiler receiver in the cable hook housing and form a common cavity, wherein the enlarged free end of one of the elastic elements can be passed through the first spoiler receiver and can be moved sideways into one of the elastic element receivers.

7. The cable hook according to claim 1, wherein an insert slot for the flexible strap element is arranged centrally between the upper and lower elastic element receivers, wherein said strap element forms a loop with a retaining rod which can be placed from the side into said loop, wherein the insert slot tapers from the loop side towards a flexible strap element portion opposite to the loop, so that the loop with the retaining rod which is adapted to be inserted therein is disposed inside the cable hook housing, advantageously in force fit when tension is exerted.

8. The cable hook according to claim 1, wherein the upper and lower elastic element receivers have tapered walls in a direction towards the first and second elastic elements forming a loop, so that the enlarged free ends are disposed in the region of the cable hook housing, advantageously in force fit when tension is exerted.

9. The cable hook according to claim 8, wherein the flexible strap element is flat and has a main plane and wherein the tapering walls are oriented substantially perpendicularly to the main plane of the flexible strap element.

10. The cable hook according to claim 1, wherein the cable hook housing of the cable hook has around its circumference two insertion openings in the upper surface and two insertion openings in the lower surface for insertion of the first and second elastic elements.

11. A method for fixing a rebound mat to a trampoline frame with the method steps of:
  i) providing a fixing system including a cable hook comprising a housing including two spaced upper elastic element receivers and a first spoiler receiver located centrally between the two upper elastic element receivers, and two spaced lower elastic element receivers and a second spoiler receiver located centrally between the two lower elastic element receivers,
  ii) passing a flexible strap element through a central insert slot in the cable hook for lateral insertion of a retaining rod in a loop opening of the flexible strap element and pulling the flexible strap element back into the insert slot,
  iii) looping a first elastic element having a first and a second enlarged free end around a portion of the trampoline frame,
  iv) passing the first enlarged free end of the first elastic element through the first spoiler receiver of the cable hook and moving the first enlarged free end of the first elastic element sideways into one of the lateral elastic element receivers, v) passing the second enlarged free end of the first elastic element through the second spoiler receiver of the cable hook and moving the second enlarged free end of the first elastic element sideways into the lateral elastic element receiver lying on the same side of the spoiler receiver, vi) looping a second elastic element having a first and a second enlarged free end around a portion of the trampoline frame, vii) passing the first enlarged free end of the second elastic element through the first spoiler receiver of the cable hook and moving the first enlarged free end of the second elastic element sideways into the remaining, opposite lateral elastic element receiver, viii) passing the second enlarged free end of the second elastic element through the second spoiler receiver of the cable hook and moving the second enlarged free end of the second elastic element sideways into the remaining, opposite lateral elastic element receiver, ix) securing the two enlarged free ends of the first and second elastic elements of the cable hooks in the assigned receiving spaces of the cable hook in order to clamp the rebound mat in the trampoline frame.

* * * * *